US012668117B2

(12) United States Patent
Hughes et al.

(10) Patent No.: US 12,668,117 B2
(45) Date of Patent: Jun. 30, 2026

(54) VEHICLE AND SUSPENSION ARM ASSEMBLY

(71) Applicant: FR8 Technology Limited, Birmingham (GB)

(72) Inventors: Thomas Hughes, Cheshire (GB); Aniruddha Shrikant Kabra, West Midlands (GB)

(73) Assignee: FR8 Technology Limited, Birmingham (GB)

( * ) Notice: Subject to any disclaimer, the term of this patent is extended or adjusted under 35 U.S.C. 154(b) by 343 days.

(21) Appl. No.: 18/277,183

(22) PCT Filed: Dec. 22, 2021

(86) PCT No.: PCT/GB2021/053409
§ 371 (c)(1),
(2) Date: Aug. 14, 2023

(87) PCT Pub. No.: WO2022/175637
PCT Pub. Date: Aug. 25, 2022

(65) Prior Publication Data
US 2024/0116355 A1 Apr. 11, 2024

(30) Foreign Application Priority Data

Feb. 19, 2021 (GB) ...................................... 2102372

(51) Int. Cl.
B60K 7/00 (2006.01)
B60G 7/00 (2006.01)
(Continued)

(52) U.S. Cl.
CPC ............ B60K 7/0007 (2013.01); B60G 7/001 (2013.01); B60K 17/043 (2013.01); B60K 25/08 (2013.01);
(Continued)

(58) Field of Classification Search
CPC .... B60K 7/0007; B60K 17/043; B60K 25/08; B60K 2007/0038; B60G 7/001; B60G 2300/04; B60G 2300/042
See application file for complete search history.

(56) References Cited

U.S. PATENT DOCUMENTS 11,794,545 B1 * 10/2023 Klein ..................... B60G 11/27
2008/0018064 A1 1/2008 Martin et al.
(Continued)

FOREIGN PATENT DOCUMENTS

CN 102009576 A 4/2011
CN 202294238 U 7/2012
(Continued)

OTHER PUBLICATIONS

First Office Action and Search Report for China Patent Application No. 2021800939747 dated Jun. 15, 2024.
(Continued)

*Primary Examiner* — Erez Gurari
(74) *Attorney, Agent, or Firm* — Young Basile Hanlon & MacFarlane, P.C.

(57) ABSTRACT

A vehicle (8) comprising a vehicle body (81), a ground-engaging wheel (7), a suspension arm (1) by means of which the wheel (7) is mounted on the vehicle body (81), an electric motor/generator (2) with a mechanical driveline by means of which the motor/generator (2) is connected to the wheel (7) such that rotation of the wheel (7) about a wheel axis (B) may be driven by the motor (2) or rotation of the wheel may drive the generator (2), wherein the motor/generator (2) is mounted on the suspension arm (1).

18 Claims, 17 Drawing Sheets

(51) Int. Cl.
    B60K 17/04    (2006.01)
    B60K 25/08    (2006.01)

(52) U.S. Cl.
    CPC .... *B60G 2300/04* (2013.01); *B60G 2300/042*
    (2013.01); *B60K 2007/0038* (2013.01)

(56) References Cited

U.S. PATENT DOCUMENTS

| | | | |
|---|---|---|---|
| 2017/0320382 A1 | 11/2017 | Milton et al. | |
| 2019/0375287 A1 | 12/2019 | Verbridge | |
| 2020/0385072 A1* | 12/2020 | Schutt | B60G 9/003 |
| 2024/0116355 A1* | 4/2024 | Hughes | B60G 7/001 |
| 2024/0294045 A1* | 9/2024 | Favaretto | B60K 7/0007 |
| 2024/0308327 A1* | 9/2024 | Ding | B66F 9/063 |
| 2024/0317004 A1* | 9/2024 | Mohrlock | F16C 11/0695 |
| 2025/0196616 A1* | 6/2025 | Limaye | B60G 3/20 |

FOREIGN PATENT DOCUMENTS

| | | |
|---|---|---|
| CN | 203558142 U | 4/2014 |
| CN | 206030979 U | 3/2017 |
| CN | 112218766 A | 1/2021 |
| CN | 112334349 A | 2/2021 |
| EP | 2374648 A2 | 10/2011 |
| FR | 2923752 A3 | 5/2009 |
| FR | 2973300 A1 | 10/2012 |
| JP | 2009196441 A | 9/2009 |
| JP | 2009208714 A | 9/2009 |
| KR | 101793169 B1 | 11/2017 |
| WO | 2006062125 A1 | 6/2006 |
| WO | 2019/217861 A1 | 11/2019 |

OTHER PUBLICATIONS

International Search Report and Written Opinion for International Patent Application No. PCT/GB2021/053409 dated Mar. 10, 2022.
Search Report for Great Britain Patent Application No. GB2102372.6 dated Aug. 19, 2021.

* cited by examiner

VEHICLE AND SUSPENSION ARM ASSEMBLY

CROSS-REFERENCE TO RELATED APPLICATIONS

This application is a United States national stage application of, and claims priority to, International Application No. PCT/GB2021/053409 filed Dec. 22, 2021, which was published as International Publication No. WO 2022/175637 A1 and which claims the benefit of GB Patent Application No. 2102372.6, filed Feb. 19, 2021.

The present invention relates to vehicle, particularly to a vehicle with an independent electric drive system suitable for low floor commercial vehicles capable of autonomous operation, and a suspension arm assembly suitable for use in such a vehicle.

BACKGROUND

It is known to drive vehicles, includings commercial light and heavy goods vehicles, using one or more electric motors. In current electric vehicles, the electric motor is mounted either on the axle beam or integrated into the wheel hub. This means the motor or motors have to be installed under the floor of the vehicle which, since vehicles have a limited height, limits the cubic capacity of goods receiving compartment of the vehicle.

The present invention may assist in improving the capacity of the goods receiving compartment of an electrically driven commercial goods vehicle.

SUMMARY

The disclosed technology allows the space surrounding the vehicle wheels to mount an electric motor on the suspension arm. This suspension arm houses a mechanical drive connecting electric motor to the vehicle axle wheel hub so that each wheel can be driven independently by an electric drive. The motor can also be used as a generator to regenerate energy. Mounting the motor on the suspension arm allows for an extremely low floor height, which can either be used to provide increased load capacity, or to reduce drag, or combination of the two.

According to a first aspect of the disclosed technology we provide a vehicle comprising a vehicle body, a ground-engaging wheel, a suspension arm by means of which the wheel is mounted on the vehicle body, an electric motor/generator with a driveline by means of which the motor/generator is connected to the wheel such that rotation of the wheel about a wheel axis may be driven by the motor or rotation of the wheel may drive the generator, wherein the motor/generator is mounted on the suspension arm.

By virtue of the invention, the wheel motor/generator installation may not significantly constrain the floor height.

In one embodiment, the suspension arm has a first portion which is pivotally connected to the vehicle body and a second portion which is connected to the vehicle body via a spring.

The spring may be an air-spring.

In one embodiment, the electric motor/generator is mounted on the suspension arm between the first portion and the second portion.

In one embodiment, the electric motor/generator is mounted on a third portion of the suspension arm which is offset relative to a line between the first portion and the second portion.

In one embodiment, the vehicle is further provided with a wheel hub assembly, by means of which the wheel is mounted on the suspension arm 1, the wheel hub assembly being mounted on the same side of the suspension arm as the electric motor/generator. The electric motor/generator is advantageously located so that it is higher than the wheel axis. The electric motor/generator may be mounted above the wheel hub assembly. In one embodiment, the electric motor/generator is mounted directly above the centreline of the wheel.

The wheel hub assembly may comprise at least one epicyclic gear train.

The driveline may comprise a gear train, belt, chain, drive shaft with bevel gears or a combination of one or more of a gear train, belt, chain, drive shaft with bevel gears.

The driveline may be mounted on and or integrated with the suspension arm.

The driveline may be connected to a brake disc, a wheel hub or an adaptor plate.

In one embodiment, the vehicle comprises a pair of ground engaging wheels, and a pair of suspension arms by means of which the wheels are mounted on the vehicle body, one wheel being mounted each suspension arm, there being an electric motor/generator mounted on each suspension arm, each suspension arm being further provided with a mechanical driveline by means of which the motor/generator is connected to the wheel mounted on the suspension arm in question such that rotation of the wheel may be driven by the motor or rotation of the wheel may drive the generator. In this case, each suspension arm may have a first portion which is pivotally connected to the vehicle body and a second portion which is connected to the vehicle body via a spring, and each suspension arm being unconnected to each other so that each can pivot relative to the vehicle body independently of the other. Alternatively, the pair of suspension arms may be connected to each other by an axle beam which is longitudinally and vertically offset relative to the wheel axis of each of the wheels. By virtue of this longitudinal and vertical offset, such that it will allow axle beam to move under the extremely low floor height.

In one embodiment, the pair of suspension arms can be used as a single pair or in multiple axle configuration.

In one embodiment, the or each motor is operable to drive the vehicle.

In one embodiment, the motor/generator is operable to convert kinetic energy derived from rotation of the wheel or wheels to electrical energy. In this case, the vehicle may be provided with an electrical energy storage apparatus, such as a battery, which is connected to the motor/generator so that the electrical energy generated by the motor/generator may be stored in the electrical energy storage apparatus. The electrical energy generated by the motor/generator may be used to power on-board equipment including but not limited to Transport Refrigeration Units.

According to a second aspect of the disclosed technology we provide a vehicle comprising a tractor and a trailer or semi-trailer, the trailer/semi-trailer having all the features of the vehicle according to the first aspect of the invention, wherein the trailer/semi-trailer is connected to the tractor so that it can be towed by the tractor, and the tractor is provided with a drive apparatus which is operable to drive the tractor, the or each motor of the trailer being operable to either assist the drive apparatus of the tractor in driving the vehicle or to be operated instead of the drive apparatus to drive the vehicle without use of the drive apparatus of the tractor.

According to a third aspect of the disclosed technology we provide a vehicle suspension arm assembly comprising a suspension arm with first portion by means of which the arm can be pivotally connected to a vehicle body, a second portion on which is mounted a spring, the assembly further comprising an electric motor/generator, a wheel hub assembly having a wheel mount on which a wheel may be mounted, and a driveline which connects the motor/generator to the wheel hub assembly such that rotation of the wheel mount about a wheel axis may be driven by the motor or rotation of the wheel mount may drive the generator, wherein the motor/generator, wheel hub assembly and driveline are mounted on the suspension arm and the motor/generator and wheel hub assembly are on the same side of the suspension arm.

By virtue of mounting the motor/generator and wheel hub assembly on the same side of the suspension arm, the suspension arm can be arranged such that the suspension arm lies in a generally vertical plane with the motor/generator above the wheel hub assembly.

In one embodiment, the wheel hub assembly is mounted on an intermediate portion of the suspension arm which is between the first portion and second portion of the suspension arm. In this case the intermediate portion may be offset relative to a line connecting the first portion and second portion.

The wheel hub assembly may comprise at least one epicyclic gear train which is connected between the wheel mount and the mechanical driveline to transmit a drive torque between the mechanical driveline and the wheel mount. The epicyclic gear train may comprise a sun gear which is connected to the mechanical driveline so that the mechanical driveline drives or is driven by rotation of the sun gear. The epicyclic gear train may comprise a planet gear which meshes with the sun gear and which is supported by a carrier, the carrier being connected to the wheel mount such that rotation of the wheel mount is driven by or drives rotation of the carrier.

The motor/generator may mounted on the suspension arm between the first portion and second portion. The motor/generator may be mounted on a third portion of the suspension arm which is offset relative to a line between the first portion and second portion. The third portion may be connected to the intermediate portion by means of a driveline support portion of the suspension arm, the driveline being mounted on the driveline support portion.

BRIEF DESCRIPTION OF THE DRAWINGS

These and other characteristics will become clear from the following description of illustrative embodiments, given as non-restrictive examples, with reference to the attached drawings, in which.

4

Figure 7:
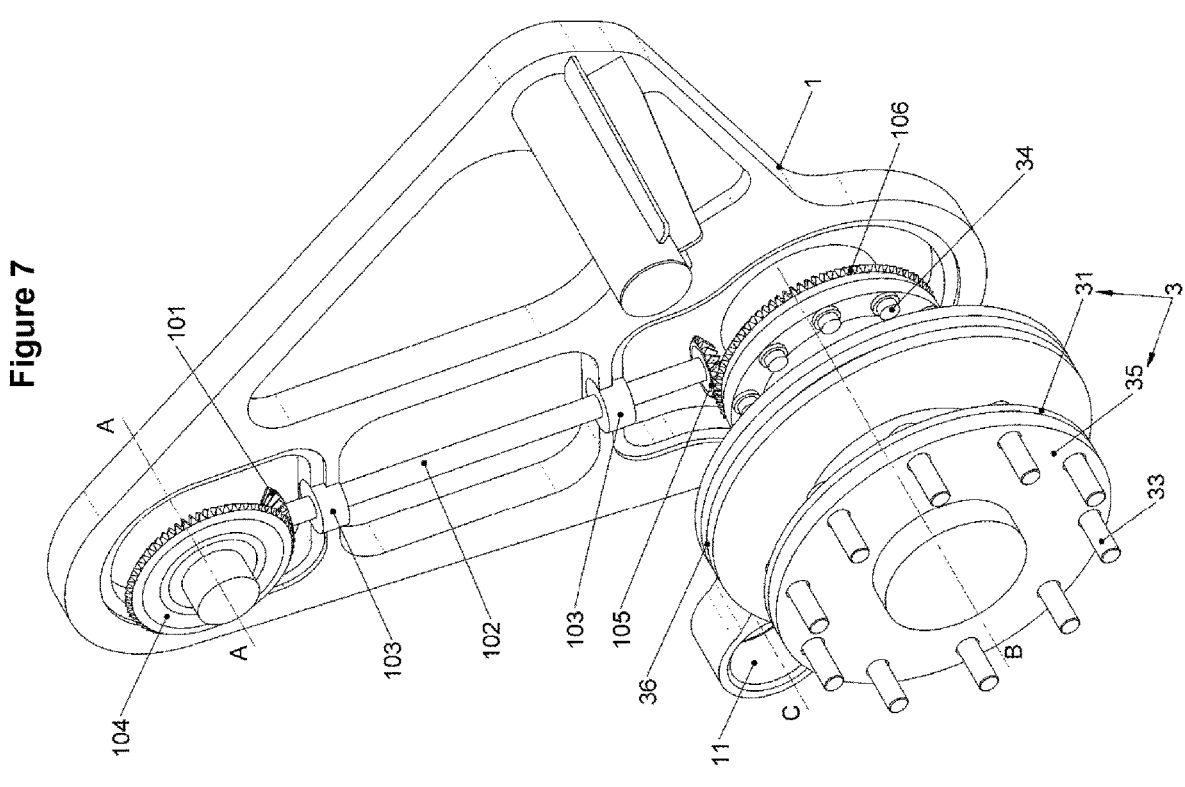
Figure 9:
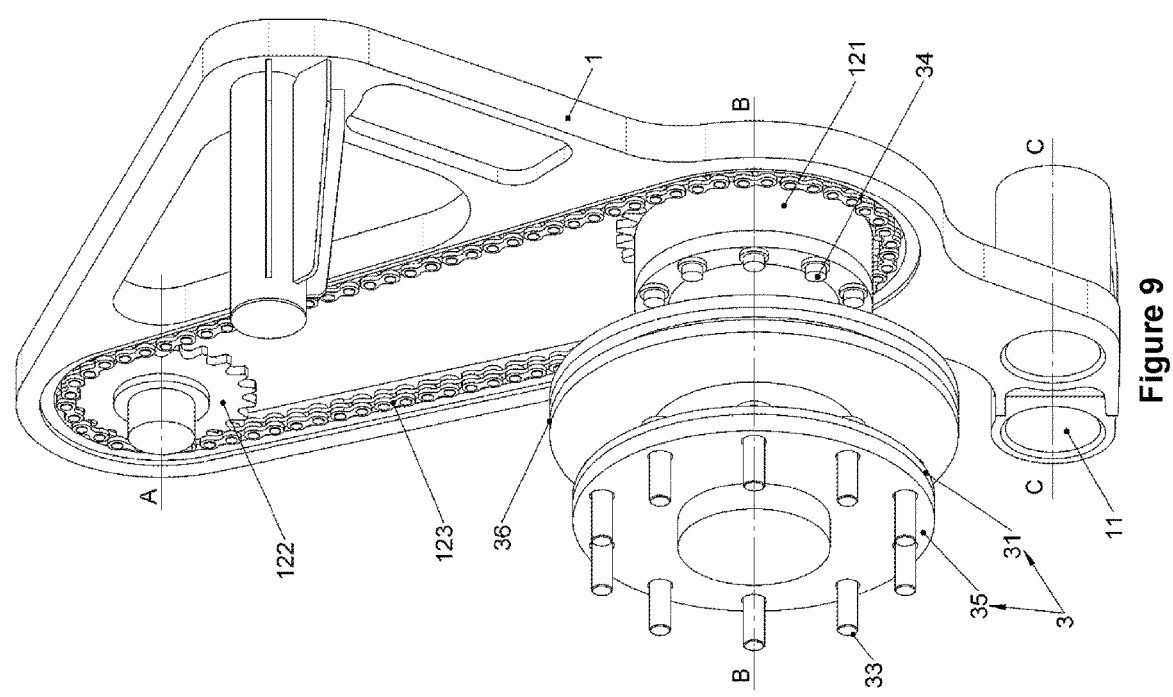
Figure 8:
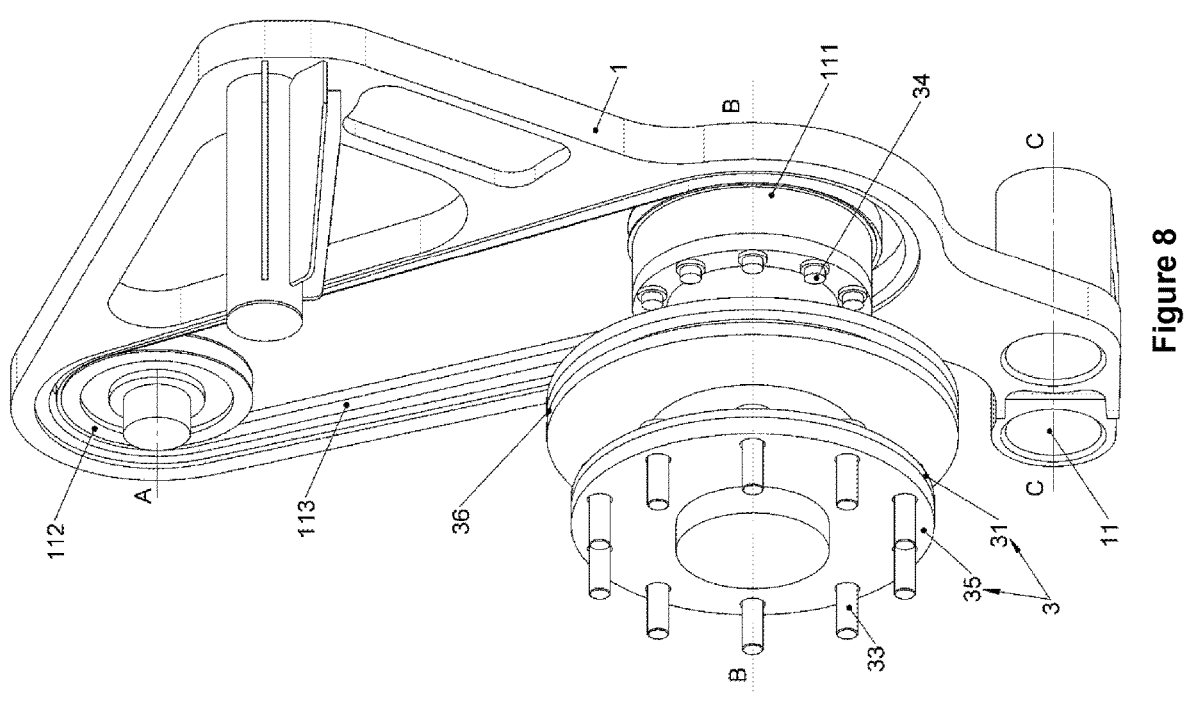
Figure 10:
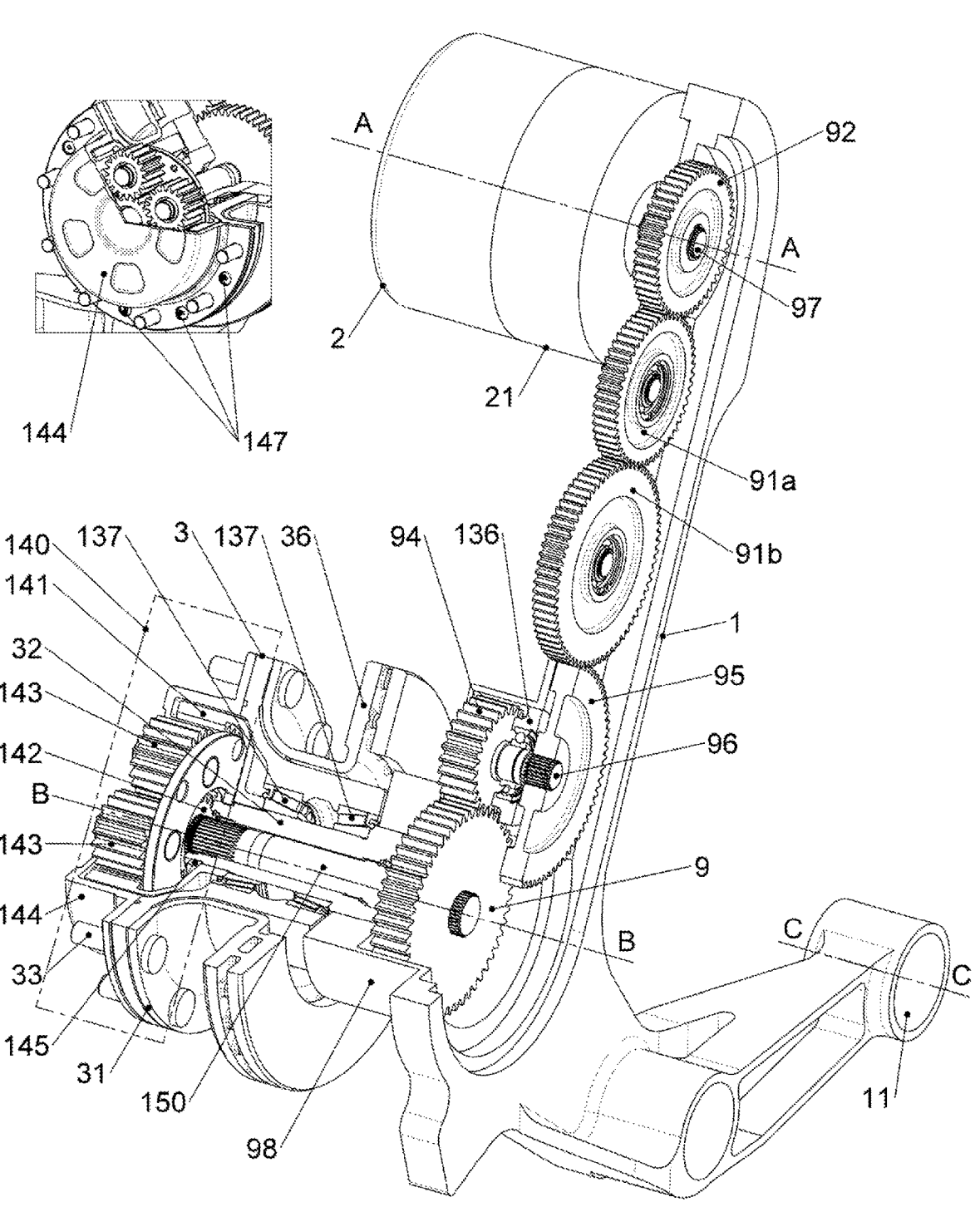
Figure 11:
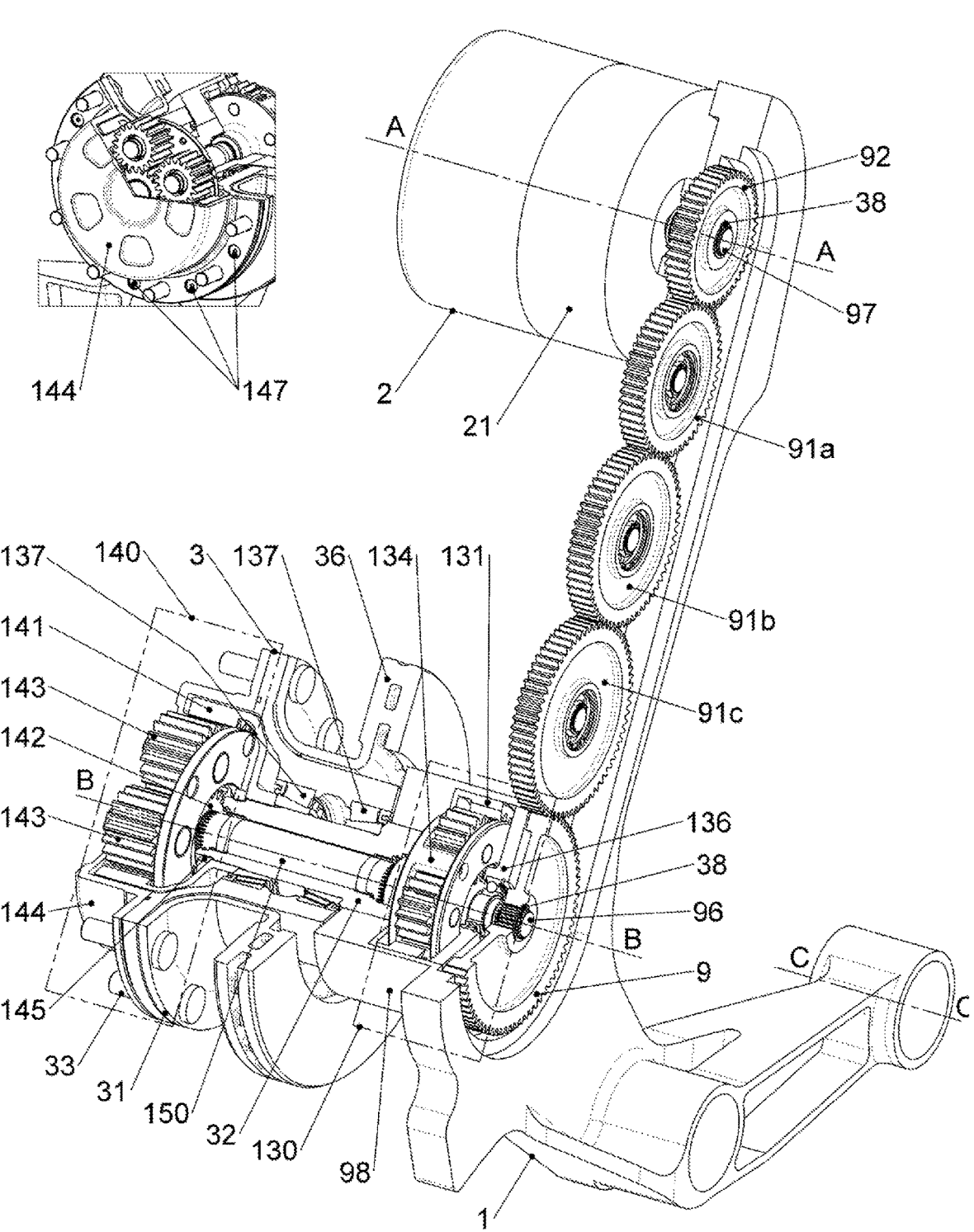
Figures 12, 13:
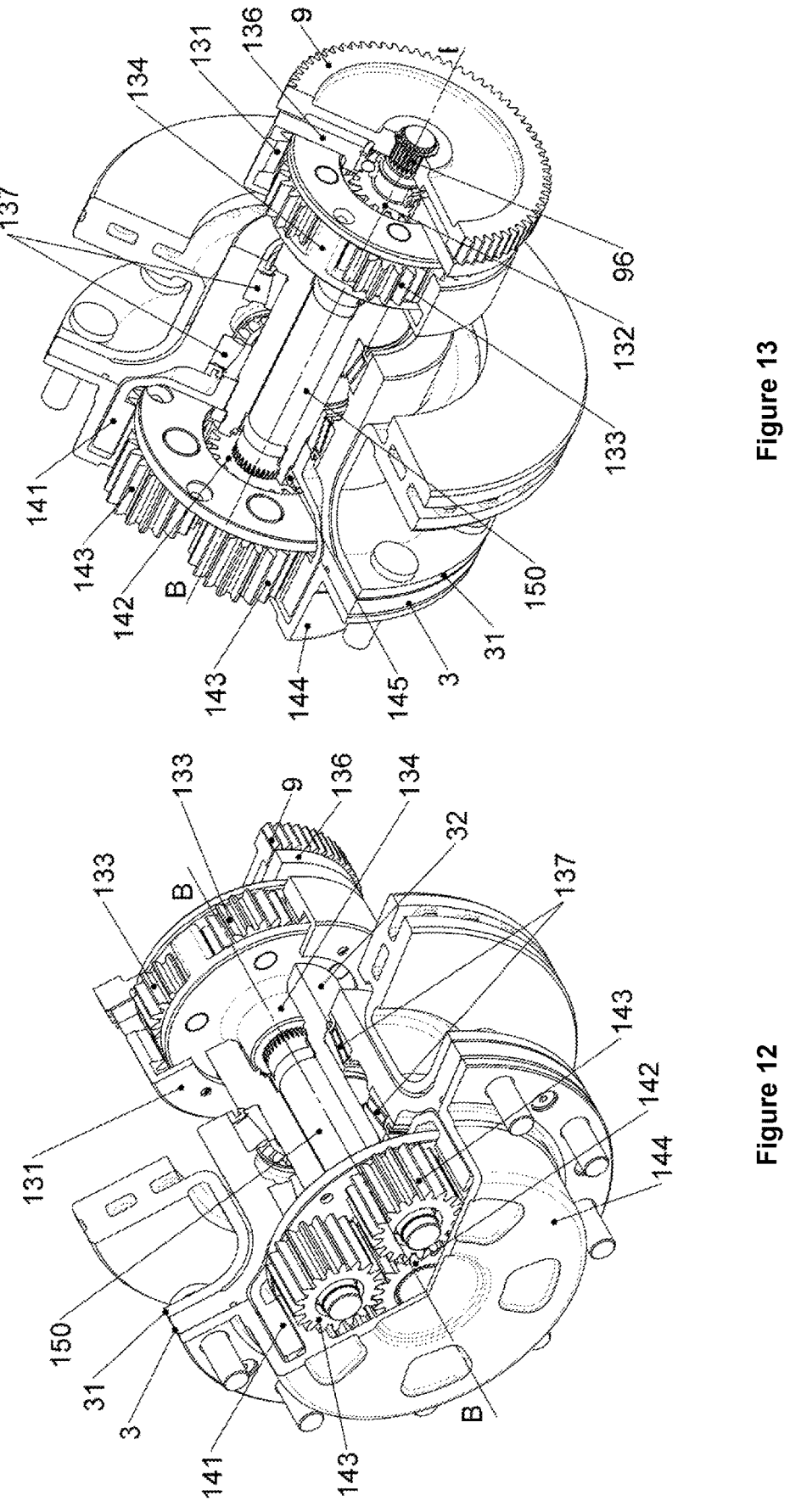
Figures 14A, 14B:
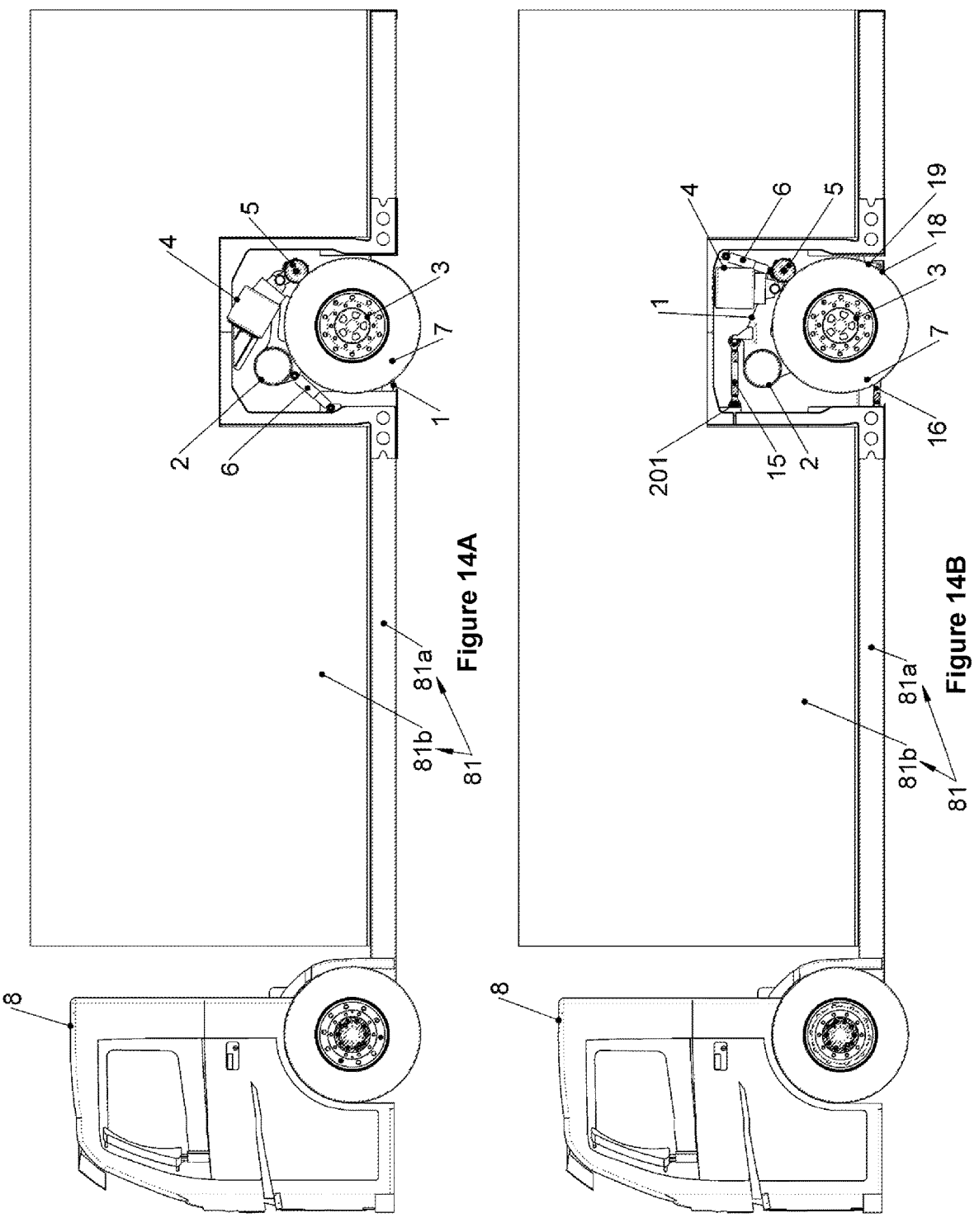
Figures 15, 16:
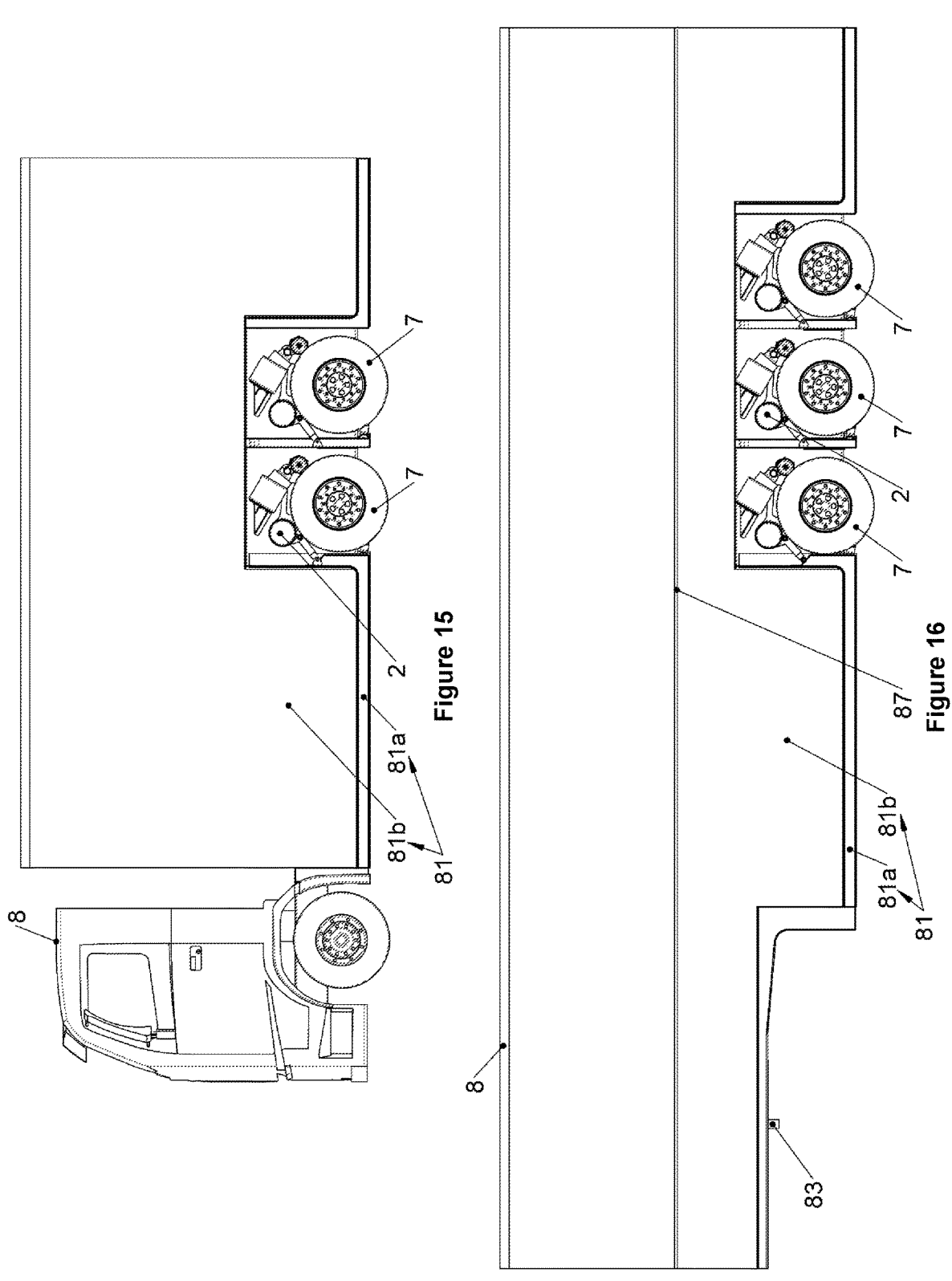
Figure 17:
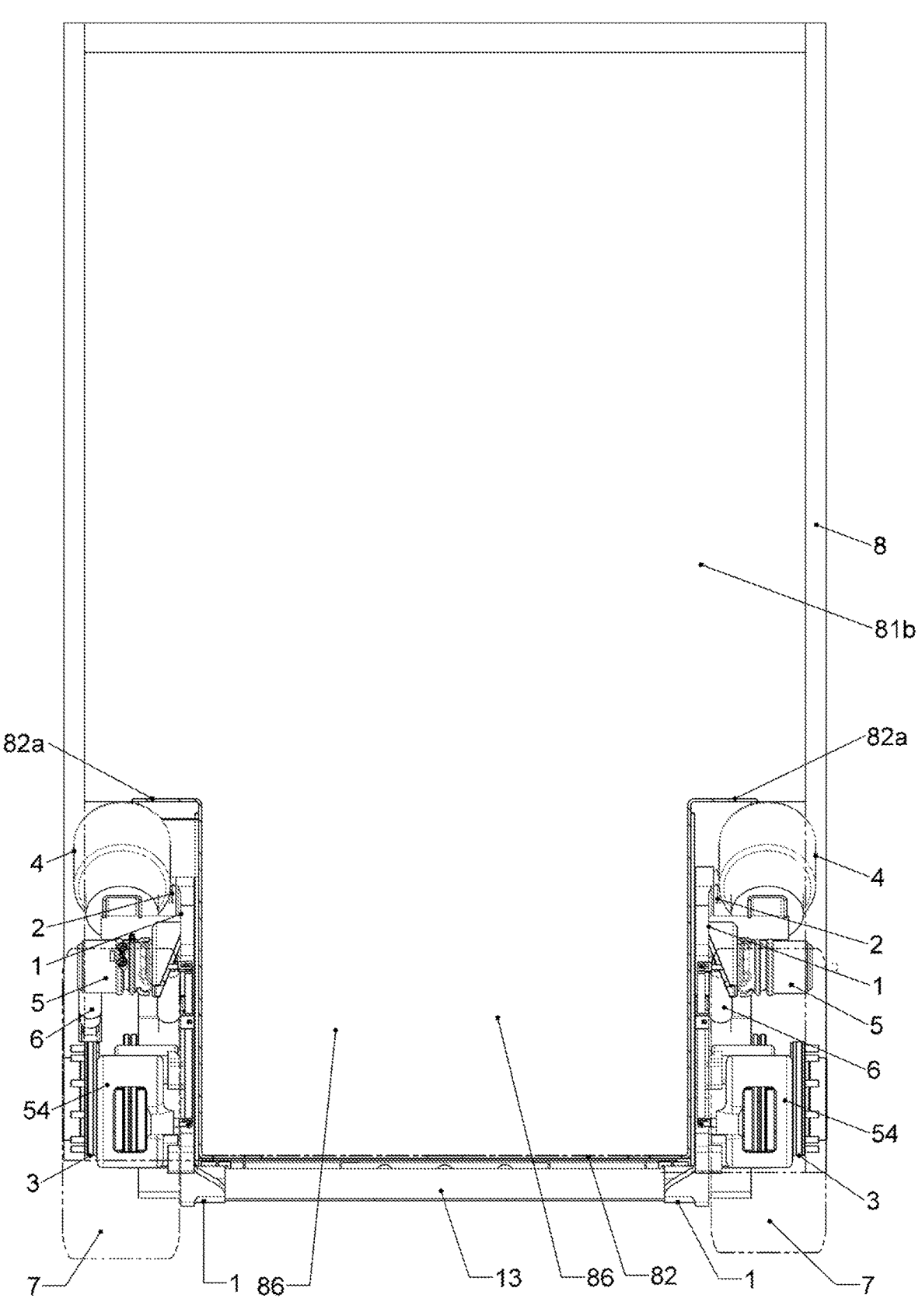
Figure 18:
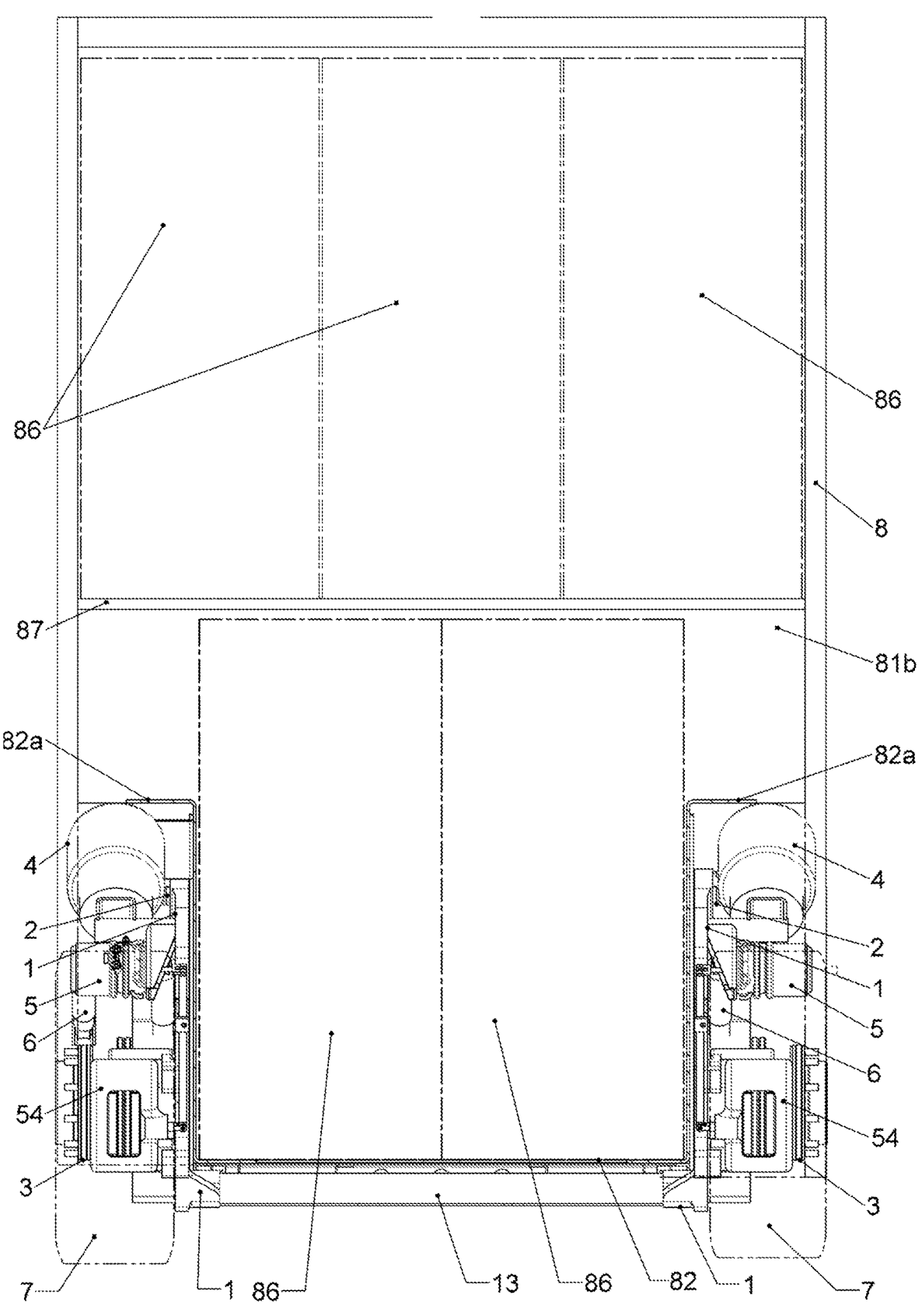
Figure 19A:
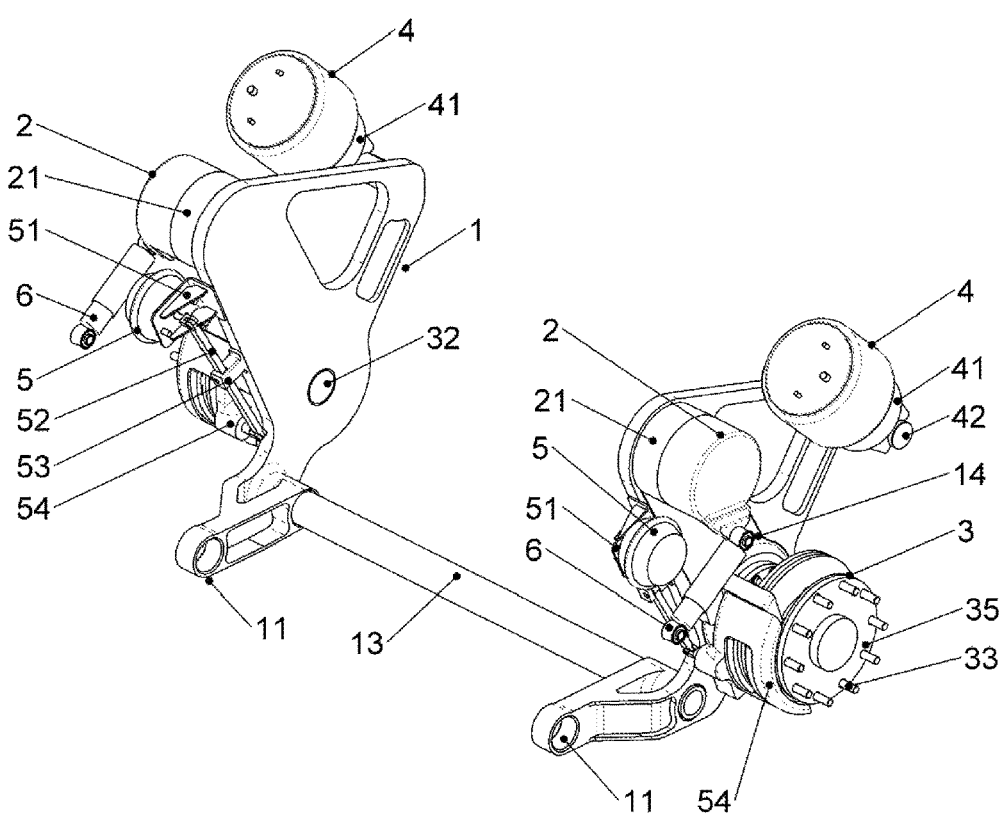
Figure 19B:
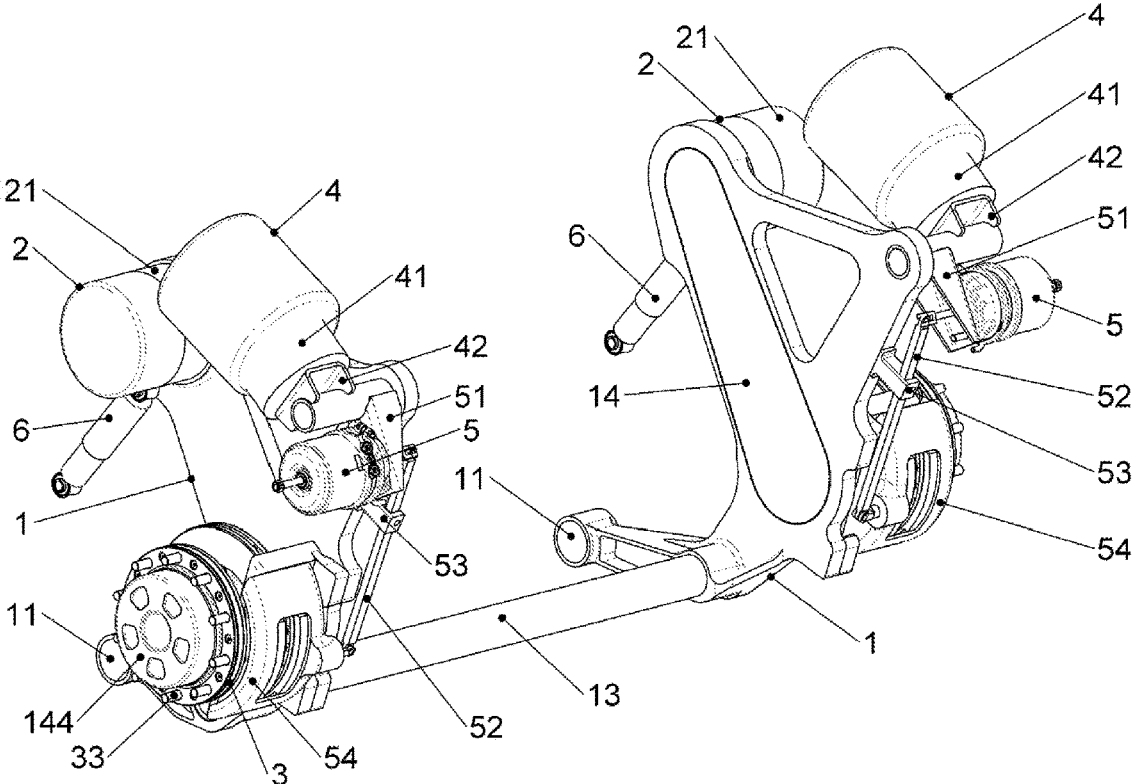
Figures 20A, 20B:
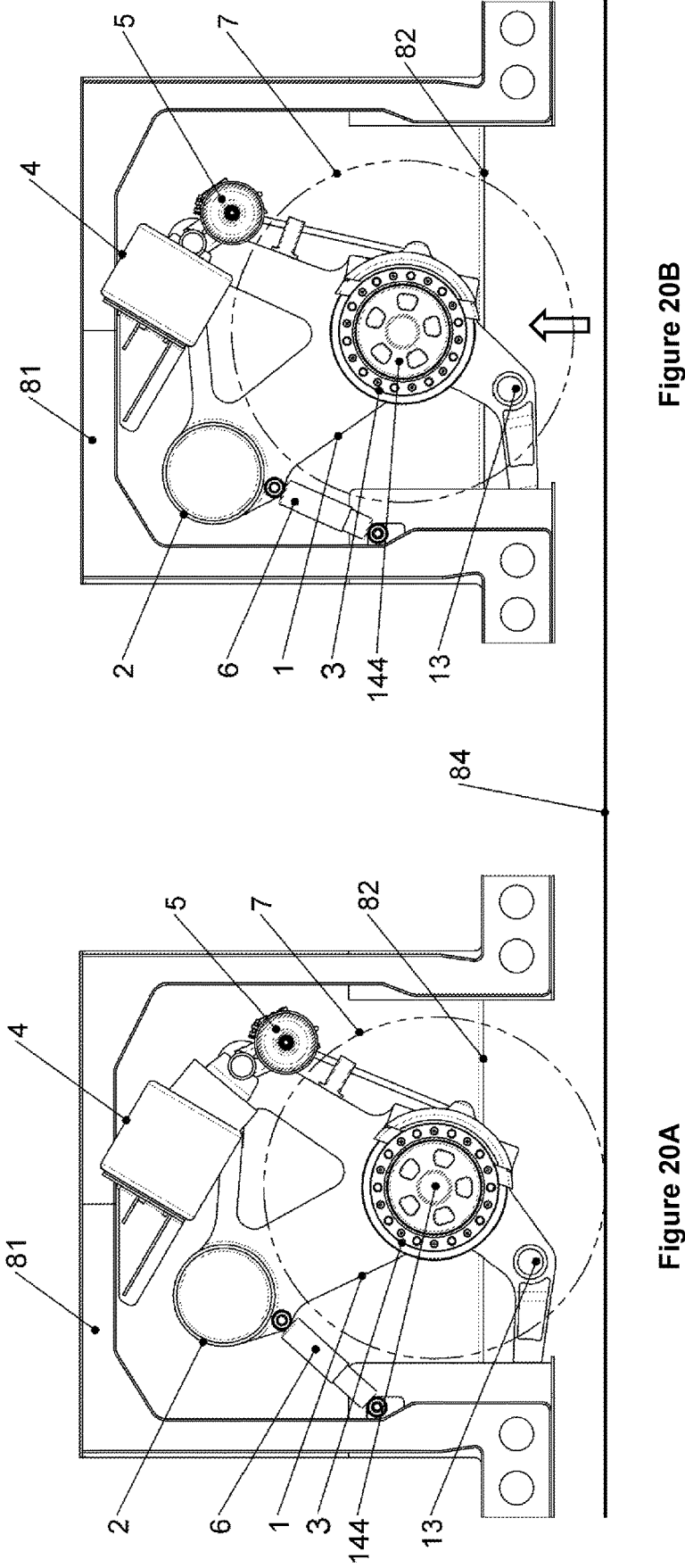
Figure 21:
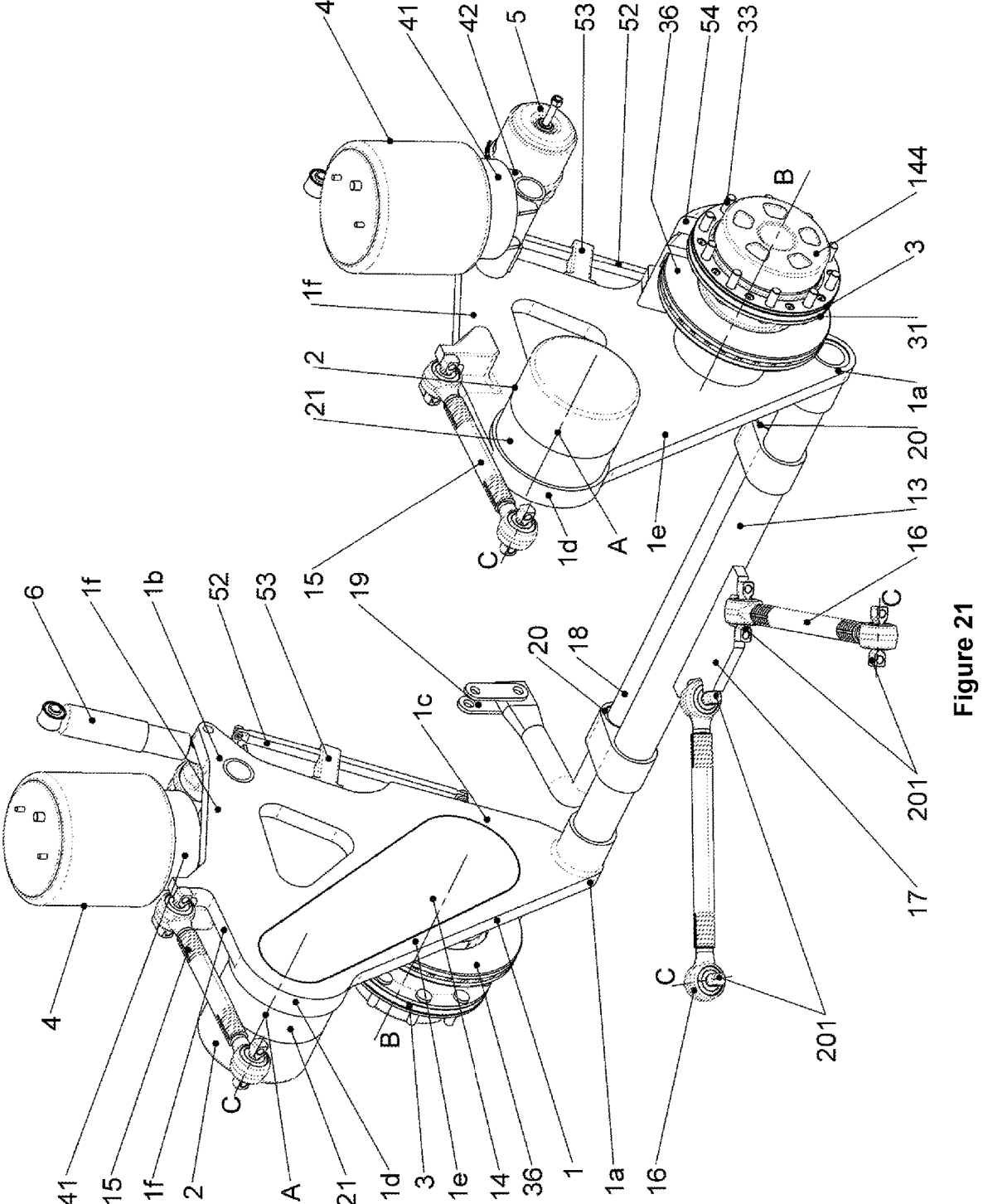
Figure 22:
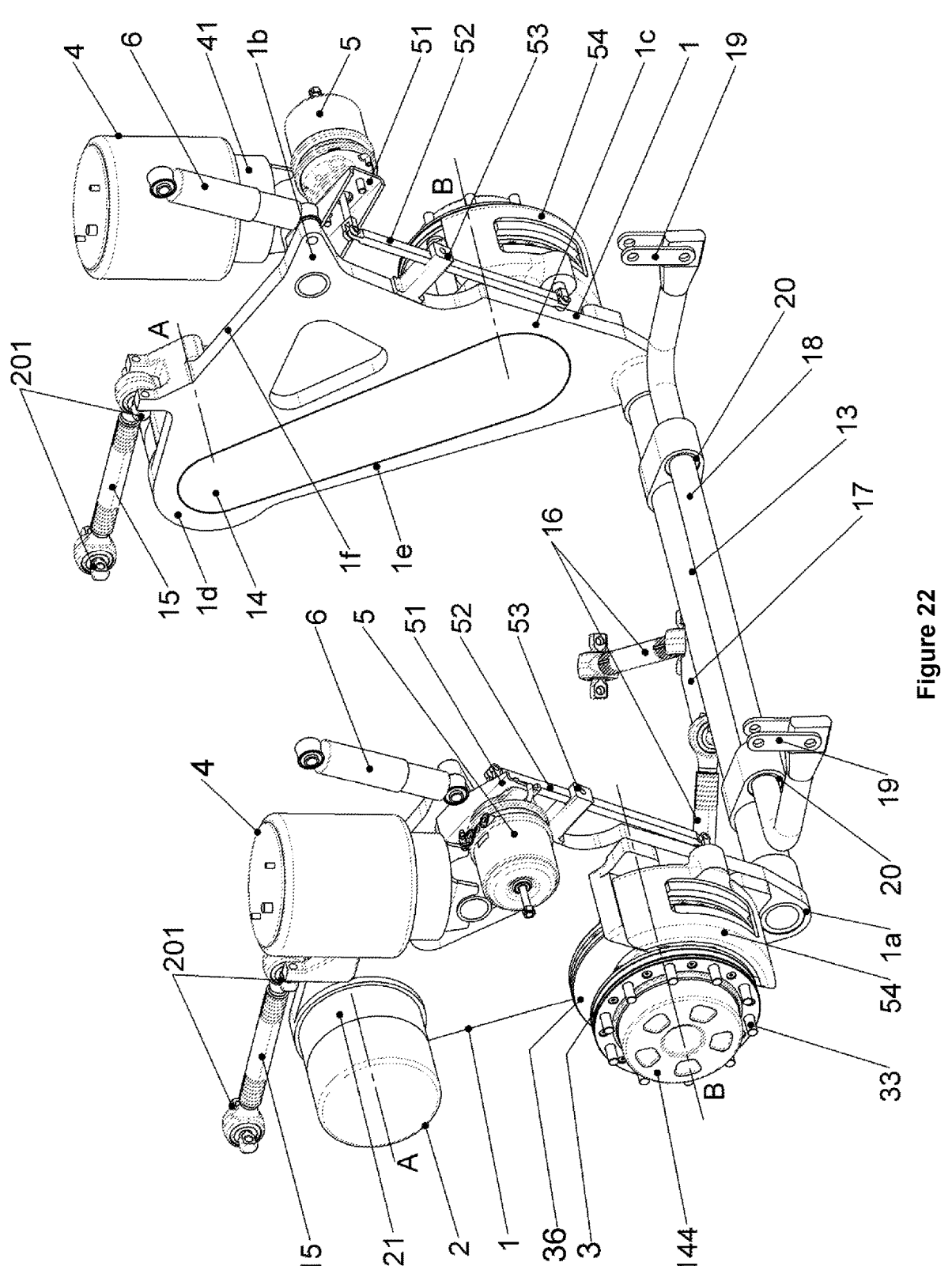
Figures 23A, 23B:
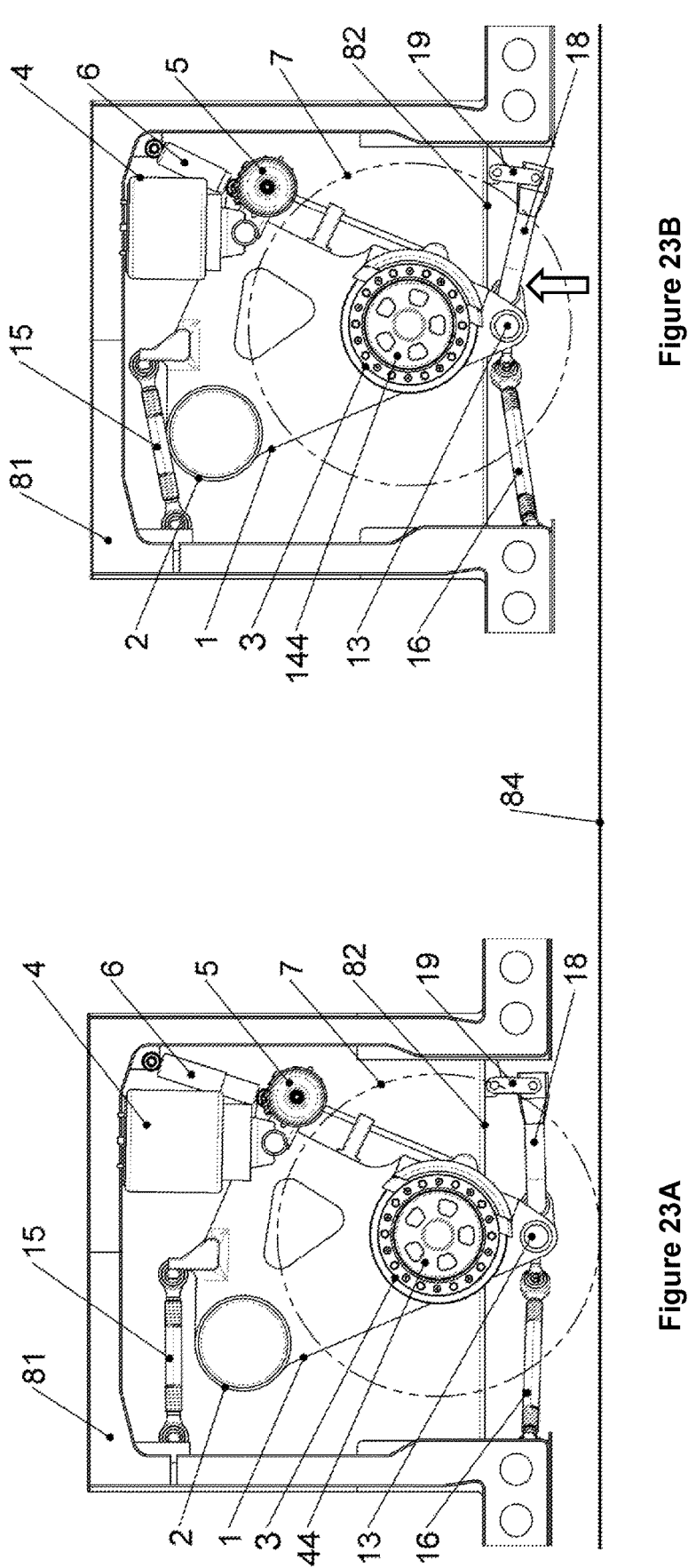

FIG. 7 is a perspective view of parts of an embodiment of suspension arm assembly according to the disclosed technology showing an alternative embodiment of driveline, FIG. 8 is a perspective view of parts of an embodiment of suspension arm assembly according to the disclosed technology showing a further embodiment of driveline, FIG. 9 is a perspective view of parts of an embodiment of suspension arm assembly according to the disclosed technology showing a further embodiment of driveline, FIG. 10 is a cut away perspective view of parts of an alternative embodiment of suspension arm assembly suitable for use in a vehicle according to the disclosed technology, FIG. 11 is a cut away perspective view of a parts of a further alternative embodiment of suspension arm assembly suitable for use in a vehicle according to the disclosed technology, FIG. 12 is a cut away perspective view of the wheel hub assembly of the embodiment of suspension arm assembly illustrated in FIG. 11, FIG. 13 is an alternative cut away perspective view of the wheel hub assembly of the embodiment of suspension arm assembly illustrated in FIG. 11, FIG. 14A is a side view of an embodiment of vehicle according to the disclosed technology, the vehicle being a rigid body heavy goods vehicle and having a single pair of wheels which are mounted on the vehicle using a suspension arm assembly according to the disclosed technology, FIG. 14B is a side view of an alternative embodiment of vehicle according to the disclosed technology, the vehicle being a rigid body heavy goods vehicle and having a single pair of wheels which are mounted on the vehicle using a suspension arm assembly according to the disclosed technology, FIG. 15 is a side view of an alternative embodiment of vehicle according to the disclosed technology, the vehicle being a rigid body heavy goods vehicle and having two pairs of wheels which are mounted on the vehicle using a suspension arm assembly according to the disclosed technology, FIG. 16 is a side view of an alternative embodiment of vehicle according to the disclosed technology, the vehicle being a semi-trailer of an articulated heavy goods vehicle and having three pairs of wheels which are mounted on the semi-trailer using a suspension arm assembly according to the disclosed technology, FIG. 17 is an end view of the vehicles illustrated in FIGS. 14A-16, FIG. 18 is an end view of the vehicles illustrated in FIGS. 14A-16 showing how the vehicle may be loaded with pallets, FIG. 19A is a perspective illustration of a pair of suspension arm assemblies suitable for use in a vehicle according to the disclosed technologies with brake cylinder mounted at the front of the suspension arm, FIG. 19B is a perspective illustration of an alternative embodiments of pair of suspension arm assemblies suitable for use in a vehicle according to the disclosed technologies with brake cylinder mounted at the rear of the suspension arm, FIG. 20A is a side view of the wheel arch portion of the vehicle illustrated in FIG. 14A with the spring of the suspension arm assembly extended, FIG. 20B is a side view of the wheel arch portion of the vehicle illustrated in FIG. 14A with the spring of the suspension arm assembly compressed, FIG. 21 is a perspective illustration of a pair of an alternative embodiment of suspension arm assemblies suitable for use in a vehicle according to the disclosed technologies, FIG. 22 is an alterative perspective view of the pair of suspension arm assemblies illustrated in FIG. 21, FIG. 23A is a side view of the wheel arch portion of the vehicle illustrated in FIG. 14B with the spring of the suspension arm assembly extended, and FIG. 23B is a side view of the wheel arch portion of the vehicle illustrated in FIG. 14B with the spring of the suspension arm assembly compressed.

DETAILED DESCRIPTION

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

Referring now to FIGS. 1, 2, 3 and 4, there is shown the overall arrangement of an embodiment of suspension arm assembly suitable for use in a vehicle according to the first and second aspects of the invention. The suspension arm assembly comprises a suspension arm 1, on which is mounted an electric motor/generator 2. The electric motor/generator is, in this embodiment, mounted on the suspension arm 1 via a gearbox 21. The provision of such a gear box is not essential, however. The motor/generator 2 is a conventional electric motor/generator and has a rotor (not shown) which rotates about a motor axis A.

The suspension arm assembly is also provided with a wheel hub assembly 3, which can rotate relative to the suspension arm 1 about a wheel axis B, and by means of which a ground engaging wheel may be mounted on the suspension arm 1. In this embodiment, the wheel axis B is generally parallel to the motor axis A. The wheel hub assembly 3 is described in more detail below.

The suspension arm assembly is also provided with a driveline by means of which the motor/generator 2 is connected to the wheel hub assembly 3 so that when used as a motor, operation of the motor/generator 2 drives rotation of the wheel hub assembly 3, and therefore rotation of a wheel mounted on the wheel hub assembly, about the wheel axis B, and enables the motor/generator 2 to act as a generator to convert kinetic energy from the rotating wheel into electrical energy. In this embodiment, the driveline is configured such that the wheel axis B is generally parallel to motor axis A. Various configurations of mechanical driveline can be used, as will be described in more detail below.

The motor/generator 2 and wheel hub assembly 3 are mounted on the same side of the suspension arm 1. Consequently, if one considers that the wheel hub assembly 3 is located between two parallel imaginary planes, with the suspension arm 1 lying in one of the these planes, the motor/generator 2 also extends from the suspension arm 1 into the space between these two imaginary planes.

The suspension arm 1 has a first portion 1a which is provided with a bush 11 by means of which the suspension arm 1 may be pivotally mounted on a vehicle body so that the suspension arm 1 is rotatable relative to vehicle body about a pivot axis C, which is generally parallel to the wheel axis B.

The suspension arm 1 has a second portion 1b on which is mounted a spring 4. The spring 4 is configured to be connected to the vehicle body, so that the second portion of the suspension arm 1 is connected to the vehicle body via the spring 4, the spring 4 extending and compressing when the suspension arm pivots about the bush 11. In one embodiment, the spring 4 is an air spring. It could equally be a helical compression spring, or any other suitable form of suspension spring.

In this example, the air spring has a piston 41 on which are mounted brackets 42 and 43 which are rigidly mounted on the second portion 1b of the suspension arm 1 via a spring shaft 43. The spring shaft 43 has a longitudinal axis D which is generally parallel to the pivot axis C.

In this embodiment, the spring 4 is mounted on the same side of the suspension arm 1 as the motor/generator 2 and the wheel hub assembly 3. Consequently, the spring 4 is also located in the space between the imaginary planes mentioned above.

In this embodiment, the wheel hub assembly 3 is mounted on an intermediate portion 1c of the suspension arm 1 which is between the first and second portions 1a, 1 b.

The first, second and intermediate portions 1a, 1 b, 1c of the suspension arm could be linear so that the pivot axis C, the spring shaft axis D, and the wheel axis B are all arranged along a generally straight line. This is not the case in this embodiment, however, and the first portion 1a of the suspension arm 1 is bent so that the wheel axis B is offset from a line connecting the pivot axis C and the spring shaft axis D.

Whilst the motor/generator 2 could be mounted on either the first or second portions 1a, 1 b of the suspension arm 1, with the driveline extending along the first or second portion 1a, 1 b to the intermediate portion 1c, in this embodiment the motor/generator 2 is mounted on a third portion 1d of the suspension arm 1c which lies between the first portion 1a and the second portion 1b, but which is offset from a line joining first portion 1a to the second portion 1b. The third portion 1d of the suspension arm 1 is connected to the intermediate portion 1c by a driveline support portion 1e, along which the driveline extends to connect the motor/generator 2 to the wheel hub assembly 3.

Although not essential, in this embodiment, to enhance the stability of the suspension arm 1, the suspension arm 1 also includes a support strut 1f which extends from the second portion 1b to the third portion 1d. The driveline support portion 1e, support strut 1f and second portion 1b of the suspension arm 1 thus form a triangle, with the motor axis A, the wheel axis B and the spring shaft axis D at the three corners of the triangle.

Although not essential, in this embodiment, the suspension arm assembly is also provided with a damper 6 which has a first end which is pivotally connected to the suspension arm 1, and a second end which is, in use, pivotally connected to the vehicle body. In this embodiment, the first end of the damper 6 is pivotally connected to the motor/generator 2, although it will be appreciated that it could be connected to any other convenient point on the suspension arm 1.

The damper 6 is configured to dampen oscillation of the suspension arm 1 when the vehicle is in use, as is conventional in air suspension systems, and may comprises a hydraulic piston and cylinder, or any other conventional form of suspension damper.

In use, the points of connection between the vehicle body and the first portion 1a of the suspension arm 1 and the spring 4 are arranged such that the wheel hub moves generally vertically as the spring 4 extends or compresses. In other words, the orientation of the air spring 4 along with the damper 6 which is connected between the vehicle body and the suspension arm 1 is such that the spring 41 provides vertical control to the suspension arm 1.

Figures 3, 4:
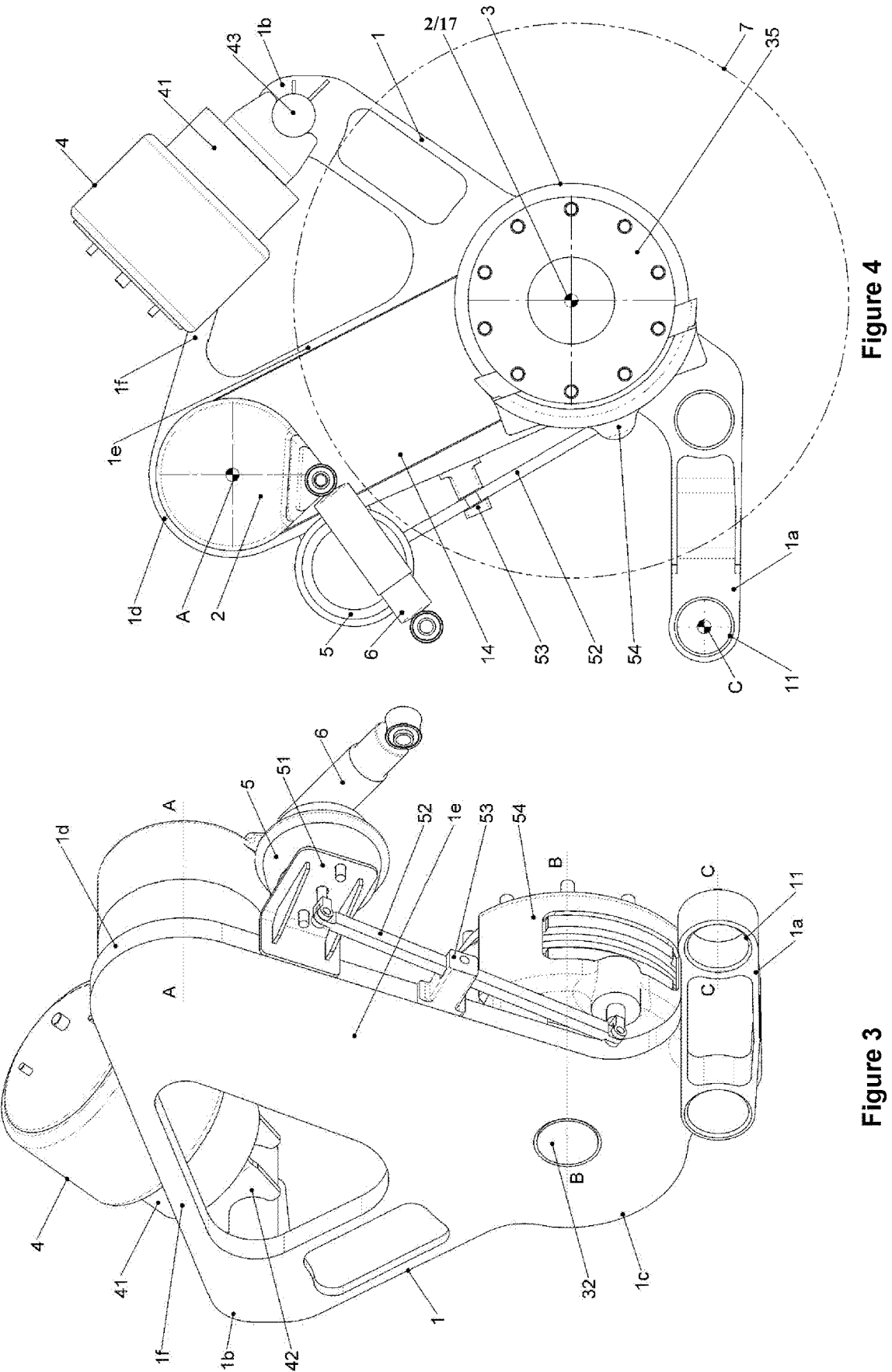
FIG. 3 is a further alternative perspective view of the embodiment of suspension arm assembly illustrated in FIG. 1.
FIG. 4 is a side view of the embodiment of suspension arm illustrated in FIG. 1.

In this embodiment, in use, the suspension arm 1 is arranged as illustrated in FIG. 4, such that the first portion 1*a* is the lowest part, the intermediate and second portions 1*c*, 1*b* being displaced horizontally, and vertically with respect to the first portion 1*a*. The wheel axis B therefore lies between the pivot axis C and the spring shaft axis D in both a vertical and horizontal direction, and the wheel axis B, and spring shaft axis D are higher than the pivot axis C.

The suspension arm 1 is also arranged such that the driveline support portion 1*e* extends upwardly from the intermediate portion 1*c*, so that the motor axis A is higher than the wheel axis B. Whilst the motor axis A could be directly above the wheel axis B, in this embodiment, the motor/generator 2 is slightly closer, in the horizontal direction, to the pivot axis C than the wheel axis B, but is higher than the top of a wheel 7 mounted on the wheel hub assembly 3. It should be appreciated that the suspension arm 1 could be configured so that the motor/generator 2 is located with the motor axis A anywhere in a semi-circular arc extending from and above the wheel axis B. The suspension arm 1 could, for example, be configured so that the wheel axis B is closer to the pivot axis C than the motor axis A. Moreover, the suspension arm 1 could be configured so that the motor axis A is lower than the top of a wheel mounted on the wheel mounted on the wheel hub assembly 3.

Figure 5:
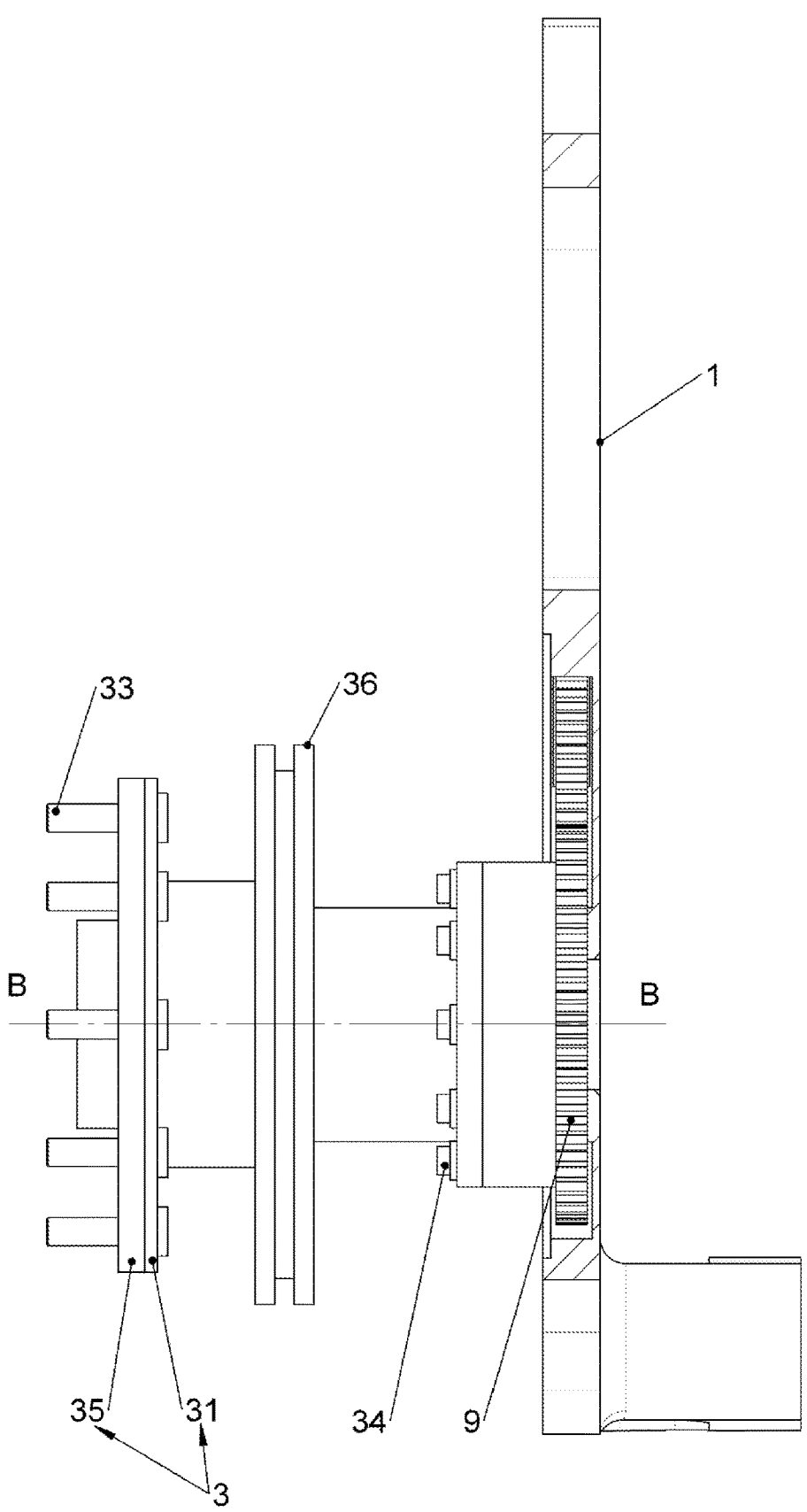
FIG. 5 is an end view of an embodiment of suspension arm assembly suitable for use in a vehicle according to the disclosed technology.

Referring now to FIG. 5, this shows a side view of the wheel hub assembly 3, which comprises a hub drive gear 9, to which is secured a suspension arm end of a brake disc unit 31 by means of bolts 34. A wheel end of the brake disc unit 31 is provided with a wheel mount which in this embodiment is an annular wheel mounting plate 35 from which extend a plurality of wheel mounting studs 33. A wheel 7 may be secured to the wheel hub assembly 3 by means of the wheel mounting studs 33, as is conventional in the art.

The hub drive gear 9 and brake disc unit 31 are mounted on an axle stub 32 which extends from the intermediate portion 1*c* of the suspension arm 1, and can rotate around the axle stub 32. The longitudinal axis of the axle stub 32 extends along the wheel axis B, and the axle stub 32 may be integral with or secured to the intermediate portion 1*c* of the suspension arm 1, e.g. by welding. The hub drive gear 9 is connected to the motor/generator 2 by means of the driveline.

A conventional bearing assembly (not shown) may be provided to minimise wear and frictional energy losses as the hub drive gear 9 and brake disc unit 31 rotate around the axle stub 32.

The brake disc unit 31 is provided with a brake disc 36 which is located between the suspension arm end and the wheel end of the unit 31, and which extends radially outwardly of the wheel axis B.

Figures 1, 2:
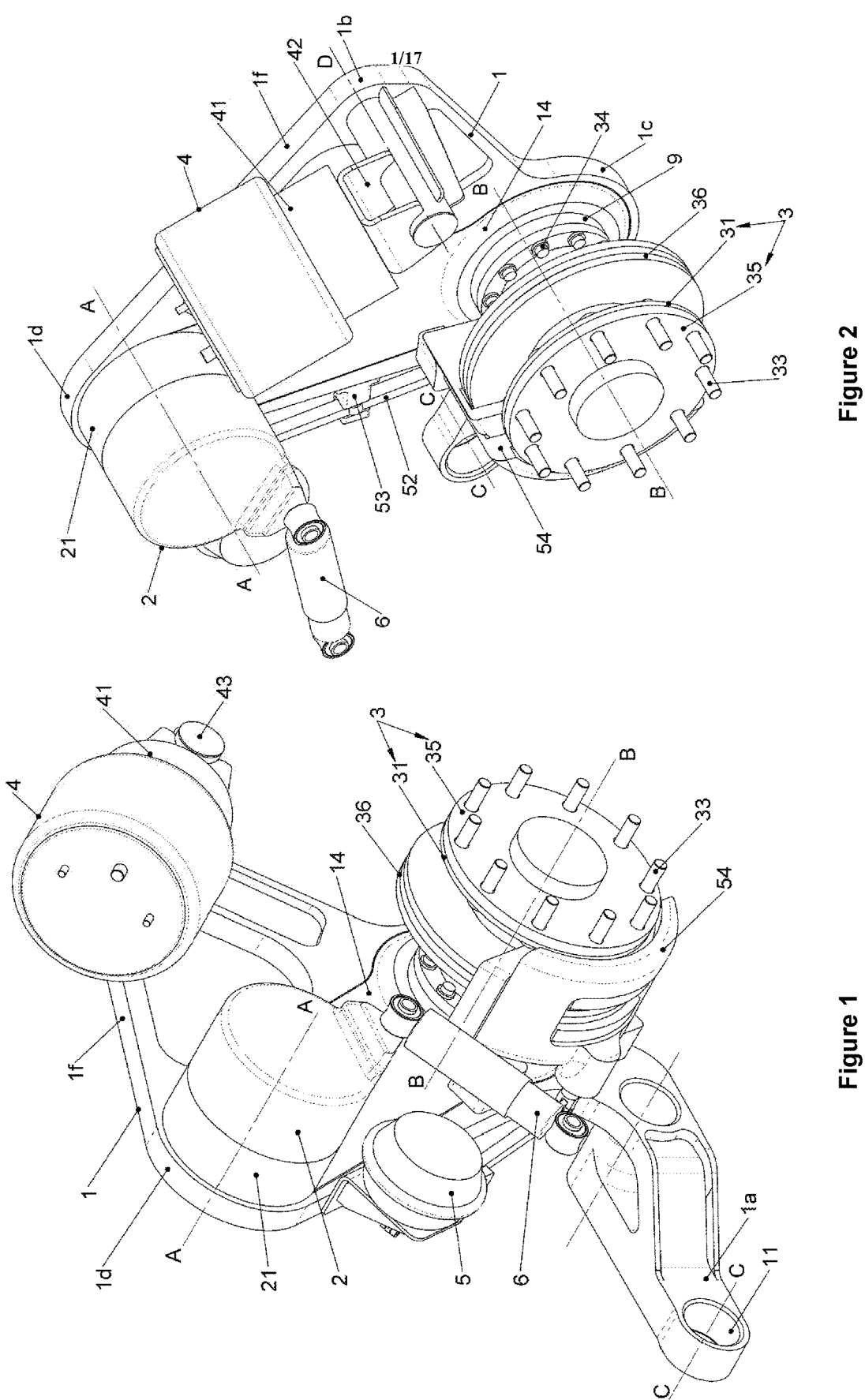
FIG. 1 is a perspective view of one embodiment of suspension arm assembly for use in a vehicle according to the disclosed technology.
FIG. 2 is an alternative perspective view of the embodiment of suspension arm assembly illustrated in FIG. 1.

As best shown in FIGS. 1 & 3, in this embodiment, the suspension arm assembly also includes a brake cylinder 5 which is mounted on the bracket 51 which is attached to the suspension arm 1. The brake cylinder 5 is mounted above the wheel hub assembly 3, and is connected to a brake caliper 54 which is mounted on the suspension arm 1 with a linkage 52. The brake cylinder 5 has a longitudinal axis and operates to produce a force parallel to this axis. The linkage 52 is pivoted at a pivot bracket 53 mounted on the suspension arm 1. This way the force output from the remotely mounted brake cylinder is transmitted to the brake caliper 54 to cause the brake caliper 54 to clamp around the brake disc 36 and brake the wheel 7 as is conventional in the art. In this embodiment, the brake cylinder is arranged so that, in use, the brake cylinder axis is generally horizontal. It should be appreciated, however, that the brake cylinder 5 could equally be mounted on the suspension arm 1 with its axis oriented generally vertically.

In this embodiment, the brake cylinder 5 is mounted on the driveline portion 1*e* of the suspension arm 1.

Advantageously, the driveline is a mechanical driveline, and various embodiments of possible mechanical driveline configurations to transmit power between the motor/generator 2 and the wheel hub assembly 3 are illustrated in FIGS. 6-9. In all cases, the driveline is mounted on the suspension arm 1, and in this embodiment on the driveline support portion 1*e* of the suspension arm 1 as described above.

Figure 6:
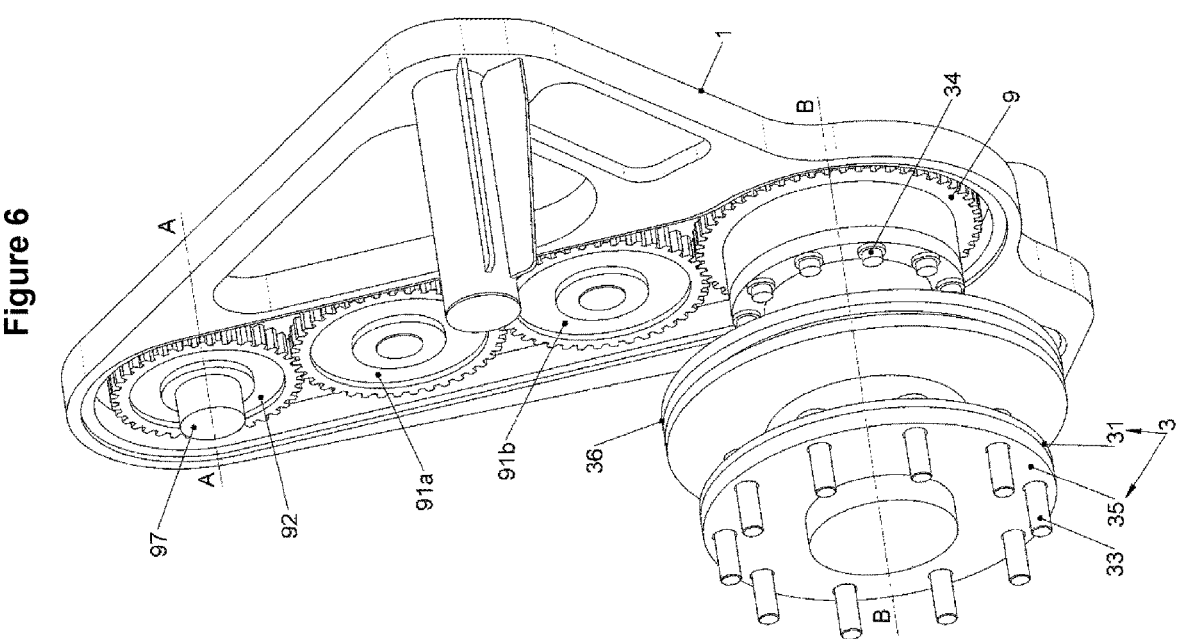
FIG. 6 is a perspective view of parts of an embodiment of suspension arm assembly according to the disclosed technology showing one embodiment of driveline.

In the embodiment illustrated in FIG. 6, the motor/generator 2 is connected to the hub drive gear 9 of the wheel hub assembly 3 by a series of intermeshing gears 91*a*, 91*b* which are mounted on gear axle stubs which are arranged along the driveline support portion 1*e* of the suspension arm 1, the gears 91*a*, 91*b* being rotatable around their respective axle stub.

The rotor of the motor/generator 2 drives or is driven by a drive shaft 97 on which is mounted a motor drive gear 92. The motor drive gear 92 meshes with a first intermediate gear 91*a*, which in turn meshes with a second intermediate gear 91*b*, which in turn meshes with the hub drive gear 9. Thus, when the motor/generator 2 is operated as a motor, the rotation of the rotor rotates the motor drive gear 92, the two intermediate gears 91*a*, 91*b*, the hub drive gear 9, and hence the wheel 7. Conversely, when operated as a generator, the wheel 7 rotates the hub drive gear 9, the intermediate gears 91*a*, 91*b*, the motor drive gear 92 and the rotor of the motor/generator 2.

Whilst in this embodiment, two intermediate gears 91*a*, 91*b* are provided it will be appreciated that there may be more or fewer than that.

In an alternative embodiment illustrated in FIG. 7, a bevel gear arrangement is used. In this embodiment, the motor drive gear 104 and hub drive gear 106 are bevel gears. The rotor of the motor/generator 2 is connected to the motor drive bevel gear 104 which is driven by the hub drive bevel gear 10 through bevel pinions 101, 105 and transmission shaft 102 as shown in FIG. 7. The transmission shaft 102 is supported by shaft bearings 103, which are mounted on the driveline portion 1*e* of the suspension arm 1.

In a further alternative embodiment illustrated in FIG. 8, a belt drive arrangement is used. In this embodiment, the motor drive gear is replaced by a motor drive pulley 112, and the hub drive gear by a hub drive pulley 111. The rotor of the motor/generator 2 is connected to the motor drive pulley 112 which drives or is driven by hub drive pulley 111 through a belt 113.

In a further alternative embodiment illustrated in FIG. 9, a chain drive is used. In this embodiment, the motor drive gear is replaced by a motor drive sprocket 122, and the hub drive gear by a hub drive sprocket. The rotor of the motor/generator 2 is connected to the motor drive sprocket 122 which drives or is driven by brake disc drive sprocket 121 through chain 123.

In all the above embodiments, the whole driveline may be housed inside the cavity in the suspension arm 1 which is sealed and covered with a suspension driveline cover 14.

It will be appreciated that the ratio of the torque generated by the motor/generator 2 and the torque applied to the wheel 7 can be tailored by the choice of size ratios of the various gears/drive pulleys or sprockets.

Ideally, the motor/generator 2 is selected which produces a relatively low torque when operated as a motor, and the size ratios of the gears/drive pulleys/sprockets are chosen so as to increase the torque applied to the wheel 7. In other words, the size ratios of the gears/drive pulleys/sprockets are chosen so that the speed of rotation of the wheel 7 is significantly lower than the speed of rotation of the rotor of the motor/generator 2.

An alternative embodiment of suspension arm assembly is illustrated in FIG. 10. In this embodiment, the wheel hub assembly includes an epicyclic gear train 140, so as to further increase the torque increase/speed reduction from the motor/generator 2 to the wheel 7. The epicyclic gear train 140 is connected between the wheel and the driveline to transmit a drive torque between the driveline and the wheel. By virtue of this arrangement, a relatively high speed/low torque motor/generator 2 can be used, and sufficient torque produced at the wheel 7 to drive even a heavy goods vehicle.

Epicyclic gear trains (or planetary gear trains) comprise at least two gears mounted so that the two gears mesh and the centre of one gear revolves around the centre of the other. A carrier connects the centres of the two gears and rotates to carry one gear (designated the planet gear) around the other gear (named the sun gear). More than one planet gear can be provided. They also comprise an outer gear ring, which has radially inward facing teeth which mesh with the teeth of the planet gear or gears. The outer gear ring may be fixed and the sun gear driven, so that rotation of the sun gear causes the carrier to rotate. Alternatively, the carrier may be fixed and the sun gear driven to rotate the ring gear.

In the embodiment illustrated in FIG. 10, the wheel hub assembly is provided with an epicyclic gear train 140 in which the outer ring gear 141 is fixed, and the carrier 144 is rotated as the sun gear 142 is driven. In this embodiment, the sun gear 142 is connected to the mechanical driveline so that the mechanical driveline drives or is driven by rotation of the sun gear, and the carrier 144 is connected to the wheel mounting plate 35 by carrier mounting bolts 147 such that rotation of a wheel mounted on the wheel mounting plate 35 is driven by or drives rotation of the carrier 144.

In this embodiment, the driveline is similar to that illustrated in FIG. 6 in that the motor/generator 2 is connected to the hub drive gear 9 of the wheel hub assembly 3 by a series of intermeshing gears 91a, 91b which are arranged along the driveline support portion 1e of the suspension arm 1. The rotor of the motor/generator 2 drives or is driven by a motor drive shaft 97 on which is mounted a motor drive gear 92. The motor drive gear 92 meshes with a first intermediate gear 91a, which in turn meshes with a second intermediate gear 91b.

In this embodiment, however, the second intermediate gear 91b meshes with a compound gear assembly which comprises a compound hub gear 95, a hub gear shaft 96 and a hub pinion 94. The compound hub gear 95 is mounted on one end of the hub gear shaft 96, and the hub pinion 94 on the other end of the hub gear shaft 96. The hub gear shaft 96 extends through an aperture provided in the driveline support portion 1e of the suspension arm, and is supported by a bearing assembly 136 which allows the hub gear shaft 96 to rotate relative to the suspension arm 1. The compound hub gear 95 is arranged on the same side of the suspension arm 1 as the intermediate gears 91a, 91b and meshes with the second intermediate gear 91b. The hub pinion 94 is located on the other side of the suspension arm 1 and meshes with the hub drive gear 9.

In this embodiment, rather than being mounted on an axle stub which is secured to the suspension arm 1, the hub drive gear 9 is mounted on one end of a wheel hub drive shaft 150 which extends along the interior of a tubular axle stub 32 so that the wheel hub drive shaft 150 can rotate within the axle stub 32 about the wheel axis B. The axle stub 32 is mounted on the intermediate portion 1c of the suspension arm 1 via a hub drive gear housing 98.

The sun gear 142 of the epicyclic gear train 140 is mounted on the opposite end of the wheel hub drive shaft 150, and therefore rotation of the sun gear 142 is driven by rotation of the hub drive gear 9. The sun gear 142 meshes with the planet gears 143 (in this embodiment there are five planet gears 143) which are mounted on planet gear carrier 144. The planet gears 143 mesh with outer ring gear 141, which is secured to the axle stub 32 to prevent rotation of the ring gear 141.

The planet gear carrier 144 is secured to the brake disc unit 31 via the wheel studs 33 and carrier mounting bolts 147, and the brake disc unit 31 is mounted around the axle stub 32 via a conventional bearing assembly 137 which is provided to minimise wear and frictional energy losses as the brake disc unit 31 rotates around the axle stub 32. It will be appreciated rotation of the sun gear 143 will drive or by driven by rotation of the planet gear carrier 144, which in turn will transfer rotation to or from the wheel 7 about the axle stub 32 via the wheel studs 33.

In a further alternative embodiment, illustrated in FIGS. 11, 12 and 13, the wheel hub assembly 3 is provided with two epicyclic gear trains—a first epicyclic gear assembly 130, and a second epicyclic gear assembly 140. This may increase the torque applied to the wheel 7 even further, and may allow a particular high speed/low torque motor/generator 2 to be used to drive a heavy goods vehicle.

In this embodiment, there is no compound gear assembly. Instead, there are three intermediate gears 91a, 91b, 91c, and the third intermediate gear 91c meshes with the wheel hub drive gear 9. The wheel hub drive gear 9 is mounted on a hub gear shaft 96 which extends through an aperture provided in the intermediate portion 1c of the suspension arm 1. The hub gear shaft 96 is supported by a bearing assembly 136 which allows the hub gear shaft 96 to rotate relative to the suspension arm 1. The wheel hub drive gear 9 is mounted on one end of the hub gear shaft 96 and the sun gear 132 of the first epicyclic gear assembly 130 is mounted on the other end of the hub gear shaft 96. Rotation of the sun gear 132 of the first epicyclic gear assembly 130 is therefore driven by rotation of the wheel hub drive gear 9.

The sun gear 132 meshes with the planet gears 133 (in this embodiment there are five planet gears 133) which are mounted on carrier 134. The planet gears 133 mesh with outer ring gear 131, which is secured to a hub drive gear housing 98 which is mounted on the intermediate portion 1c of the suspension arm 1, to prevent rotation of the ring gear 131.

The carrier 134 is secured to one end of a wheel hub drive shaft 150 which again extends along the interior of the tubular axle stub 32, so that rotation of the carrier 134 drives rotation of the wheel hub drive shaft 150 within the axle stub 32 about the wheel axis B. The axle stub 32 is mounted on the intermediate portion 1c of the suspension arm 1 via the hub drive gear housing 98.

The second epicyclic gear train 140 is configured in exactly the same way as the epicyclic gear train 140 described above in relation to FIG. 10, with the sun gear 142 of the second epicyclic gear train 140 being mounted on the other end of the wheel hub drive shaft 150, rotation of the wheel hub drive shaft 150 thus driving the rotation of the sun gear 142, the planet gear carrier 144 and wheel mount 35 as described above.

Typically, a vehicle is provided with one or more pairs of ground engaging wheels which are located on opposite sides of the vehicle. Examples of such vehicles 8 are illustrated in FIGS. 14-18. The vehicle 8 may, for example, be a commercial vehicle 8 and have a vehicle body 81 includes a chassis 81*a* on which is mounted a structure 81*b* which forms a compartment into which goods may be placed for transport. The suspension arm 1 and spring 4 are advantageously secured to the vehicle chassis 81*a*.

The suspension arm 1 is intended to be used as a trailing arm suspension, so the first portion 1*a* of the suspension arm 1 is pivotally connected to the vehicle chassis 81*a* at a point which is further towards the front of the vehicle than the wheel axle B.

In the embodiment illustrated in FIGS. 14-18, the vehicle 8 is a semi-trailer of an articulated heavy goods vehicle or a rigid vehicle. FIGS. 14A & 14B show a rigid body vehicle with one pair of wheels which are connected to the vehicle body 81 by means of a suspension arm 1 as described above.

The vehicle 8 may have more than one pair of wheels, and FIG. 15 shows a rigid body vehicle 8 with two adjacent pairs of wheels 7, whilst FIG. 16 shows a semi-trailer with three adjacent pairs of wheels. The vehicle 8 could equally be a trailer, with pairs of wheels located towards its front and rear. Where the vehicle is a semi-trailer 8 it include an apparatus (such as a kingpin 83) by means of which the trailer may be connected to a tractor so that the tractor can tow the trailer, as illustrated in FIG. 16, and as is well known in the art.

Where the vehicle is provided with plurality of pairs of wheels 7 in tandem, as illustrated in FIGS. 15 & 16, each wheel 7 of each pair may be mounted on a suspension arm 1 as described above, so that each wheel 7 can be driven by an independent motor 2. This need not be the case, however, and some of the wheels may not be driven wheels.

Each wheel 7 of the pair of wheels 7 is mounted on the vehicle body using a suspension arm 1 as described above, by securing a wheel to the wheel hub assembly 3 so that the wheel rotates with the wheel hub assembly 3 about the wheel axis B. The suspension arms 1 can be unconnected and therefore used independently on each wheel 7 of the pair, or the two suspension arms 1 could be connected with an axle beam 13 as shown in FIGS. 19A and 19B. In this embodiment, the axle beam 13 is secured to the first portion 1*a* of the suspension arm 1, at a position adjacent to the bushing 11 by means of which the suspension arm is pivotally connected to the vehicle chassis. Each end of the axle beam 13 is therefore lower than the wheel axis B.

The arrangement of the suspension arm 1 and associated parts relative to the vehicle 8 is illustrated in more detail in FIGS. 20A and 20B, and these show how the suspension arm 1 can pivot relative to the vehicle body 81 about the pivot axis C to facilitate generally vertical movement of the wheel 7 relative to the vehicle body 81. FIG. 20A shows the position of the suspension arm 1 when the spring 4 is extended and the wheel 7 in a lowered position relative to the vehicle body 81, whilst FIG. 20B shows the position of the suspension arm 1 when the spring 4 is compressed and the wheel 7 is in a raised position relative to the vehicle body 81.

Instead of being connected directly to the vehicle body 81 by means of a bushing 11 as described above, the first portion 1*a* of the suspension arm 1 may be pivotally connected to the vehicle body 81 via a torque rod. In the case, the torque rod has a first end which is pivotally connected to the first portion 1*a* of the suspension arm 1 and a second end which is pivotally connected to the vehicle body 81. This arrangement may be applied to any of the configurations of suspension arm 1 described above.

Where two opposite suspension arms 1 are connected by means of an axle beam 13 as described above, the torque rods may be connected to the axle beam 13 as illustrated in FIGS. 21 and 22. In this embodiment, the axle beam 13 joins the first portions 1*a* of the two suspension arms 1, and is connected to the vehicle body 81 by means of two lower torque rods 16.

In this embodiment, the lower torque rods 16 are arranged in a V configuration, with their first ends being pivotally connected to a central portion of the axle beam 13 and their second ends being connected the vehicle body 81 at or adjacent to the two opposite sides of the vehicle body 81. In this embodiment, the first ends of the torque rods 16 are secured to a plate 17 which is mounted on the axle beam 13, and which lies in a generally horizontal plane when the suspension arm 1 is mounted on the vehicle.

The damper 6 could be mounted in the same position as in the embodiments illustrated in FIGS. 1-20, but in the embodiments illustrated in FIGS. 21 and 22, it is mounted on the second portion 1*b* of the suspension arm 1 adjacent to the spring 4.

In this embodiment, each suspension arm 1 is provided with an upper torque rod 15, a first end of which is pivotally connected to the suspension arm 1 and a second end of which is pivotally connected to the vehicle body 81 at a point which is higher off the ground than the connection with the lower torque rod 16. In this embodiment, the upper torque rods 15 are each pivotally connected to the support strut 1*f* of the suspension arm 1.

The pivotal connections between the torque rods 15, 16 and the suspension arm 1 and vehicle body 81 are configured such that the torque rod 15, 16 can pivot in a generally vertical plane. In this embodiment each of these pivotal connections is provided by means of a pin 201 which extends generally horizontally through a bush at the respect end of the torque rod 15, 16. It should be appreciated, however, that the torque rod pin could be vertical, with vertical movement of the suspension arm 1 accommodated by deformation of a rubber bushing between the pin and the torque rod.

The arrangement of this embodiment of suspension arm 1 and associated parts relative to the vehicle 8 is illustrated in more detail in FIGS. 23A and 23B, and these show how the suspension arm 1 can move relative to the vehicle body 81 to facilitate generally vertical movement of the wheel 7 relative to the vehicle body 81.

The torque rods 15, 16 are arranged such that when they are connected to the vehicle body 81 such that they extend generally horizontally when the spring 4 is extended, as illustrated in FIG. 23A. When the spring 4 is compressed, they remain generally parallel to one another, but inclined so that their first end is higher than their second end, as illustrated in FIG. 23B.

It will be appreciated that when the suspension arm 1 is pivotally connected to the vehicle body 81 directly as described in relation to FIGS. 1-20 above, the wheel hub assembly 3 moves along an arc of a circle, so is displaced horizontally (albeit by a relatively small amount) as well as vertically. In contrast, by virtue of the use of torque rods 15, 16 the horizontal displacement of the wheel hub unit 3 can be reduced or eliminated.

The embodiment illustrated in FIGS. 21 to 23B is a non reactive suspension system in which breaking and acceleration loads cause pivoting of the upper and lower torque rods 15, 16 relative to the vehicle body 81, rather than vertical movement of the body 81. The lower torque rods are arranged in V shape to prevent lateral displacement of the suspension arm 1 as a result of lateral forces along wheel axis B caused by cornering or hitting the curb.

Although not essential, in this embodiment the suspension arms 1 are provided with an anti-roll bar 18 which is secured to the axle beam 13 via two anti roll bar bearings 20 which allows the anti-roll bar 18 to rotate about its longitudinal axis. The anti-roll bar 18 extends generally parallel to the axle beam 13, and each end is pivotally connected to vehicle body 81 by means of a drop link 19.

The anti-roll bar 18 is of a conventional configuration and is designed to provide the axle beam with the desired roll stiffness for any given application. The drop links 19 allow the ends of the anti roll bar to move horizontally as the axle beam 13 moves vertically, whilst the anti-roll bar 18 prevents the axle beam from rotating relative to the longitudinal axis of the vehicle.

By arranging suspension arm 1 as described above, the motor/generator 2 does not occupy the space between the wheels 7 in the pair. The motor/generator 2 occupies space above the wheel 7, and therefore can be accommodated in a wheel arch portion of the vehicle body 81. This means that a floor 82 of the structure 81b can be lowered to be very close to the ground, in front of and behind the pair of wheels 7 (as illustrated in FIGS. 14A, 14B, 15 & 16), and also between the wheels 7 (as illustrated in FIGS. 17 & 18), there being only a relatively small area over the wheels 7 in which the floor 82 is raised to form the wheel arches 82a.

By lowering the floor 82 of the structure 81b, and minimising the space occupied the wheel arches across the width of the vehicle, it may be possible to accommodate two layers of pallets 86 within the structure, without increasing the overall height of the vehicle, as illustrated in FIG. 18. In this embodiment, there is a generally horizontal deck 87 which divides the interior of the structure into an upper volume and a lower volume, a layer of pallets 86 two pallets wide is arranged on the floor 82 of the structure 81b in the lower volume, and a layer of pallets 86 three pallets wide is arranged on the deck 87 in the upper volume.

Where an axle beam 13 is provided, the axle beam 13 is advantageously offset both vertically and horizontally relative to the wheel axis B to allow the axle beam 13 to move under the extremely low floor 82 as shown in FIGS. 17 & 18.

The inventions are is not limited by the embodiments described above, and are as set out in the appended claims.

The invention claimed is:

1. A vehicle comprising a vehicle body, a pair of wheels located on opposite sides of the vehicle body, a suspension arm wherein one of the pair of wheels is mounted on the vehicle body, an electric motor/generator with a driveline wherein the electric motor/generator is connected to the one of the pair of wheels such that rotation of the one of the pair of wheels about a wheel axis may be driven by the electric motor/generator or that rotation of the one of the pair of wheels may drive the electric motor/generator, the electric motor/generator rotating about a motor axis (A), the vehicle further comprising a wheel hub assembly wherein the electric motor/generator is mounted on the suspension arm, the wheel hub assembly and the electric motor/generator being mounted on a same side of the suspension arm so that the wheel hub assembly is located between two parallel imaginary vertical planes with the suspension arm lying in one of the two parallel imaginary vertical planes, and the electric motor/generator also extends from the suspension arm into a space between the two parallel imaginary vertical planes, the motor axis being located anywhere along a semi-circular arc about the wheel axis, wherein the electric motor/generator is not located in the space between the pair of wheels.

2. The vehicle according to claim 1, wherein the suspension arm has a first portion which is pivotally connected to the vehicle body and a second portion which is connected to the vehicle body via a spring.

3. The vehicle according to claim 2, wherein the electric motor/generator is mounted on the suspension arm between the first portion and the second portion.

4. The vehicle according to claim 3, wherein the electric motor/generator is mounted on a third portion of the suspension arm which is offset relative to a line extending between the first portion and the second portion.

5. The vehicle according to claim 1, wherein the electric motor/generator is mounted above the wheel hub assembly.

6. The vehicle according to claim 1, wherein the electric motor/generator is mounted directly above a centreline of the one of the pair of wheels.

7. The vehicle according to claim 1, wherein the wheel hub assembly comprises at least one epicyclic gear train.

8. The vehicle according to claim 1, wherein the driveline comprises a gear train, a belt, a chain, a drive shaft with bevel gears or a combination of one or more of the gear train, the belt, the chain, and the drive shaft with the bevel gears.

9. The vehicle according to claim 1, wherein the driveline is mounted on and or integrated with the suspension arm.

10. The vehicle according to claim 1, wherein the driveline is connected to a brake disc, a wheel hub or an adaptor plate.

11. The vehicle according to claim 1, wherein the vehicle further comprises a pair of suspension arms wherein the pair of wheels are mounted on the vehicle body, each one of the pair of wheels being mounted to each one of the pair of suspension arms, there being a pair of electric motor/generators wherein one of the pair of electric motor/generators is mounted on each one of the pair of suspension arms, each one of the pair of suspension arms being further provided with a driveline wherein each one of the pair of electric motor/generators is connected to one of the pair of wheels mounted on one of the pair of suspension arms such that rotation of each of the pair of wheels may be driven by one of the pair of electric motor/generators or that rotation of each of the pair of wheels may drive one of the pair of electric motor/generators, each one of the pair of electric motor/generators rotating about a motor axis, the vehicle further comprising a pair of wheel hub assemblies wherein each one of the pair of wheels is mounted on one of the pair of suspension arms, each one of the pair of wheel hub assemblies and each one of the pair of electric motor/generators being mounted on one of the pair of suspension arms on a same side of the vehicle so that the pair of wheel hub assemblies is located between two parallel imaginary vertical planes with one of the pair of suspension arms lying in one of the two parallel imaginary vertical planes, and each one of the pair of electric motor/generators also extends from one of the pair of suspension arms into a space between the two parallel imaginary vertical planes, the motor axis being located anywhere along a semi-circular arc about the wheel axis, wherein each of the pair of electric motor/generators is not located in the space between the pair of wheels.

12. The vehicle according to claim 11, wherein each one of the pair of suspension arms has a first portion which is pivotally connected to the vehicle body and a second portion which is connected to the vehicle body via a spring, and each one of the pair of suspension arms is not connected to each other so that each one of the pair of suspension arms can pivot relative to the vehicle body independently of the other.

13. The vehicle according to claim 11, wherein the pair of suspension arms are connected to each other by an axle beam which is longitudinally and vertically offset relative to the wheel axis of each of the pair of wheels.

14. A vehicle comprising a tractor and a trailer or a semi-trailer, the trailer or the semi-trailer having a vehicle body, a ground-engaging wheel, a suspension arm wherein the wheel is mounted on the vehicle body, an electric motor/generator with a driveline by means of which the motor/generator is connected to the wheel such that rotation of the wheel about a wheel axis may be driven by the electric motor/generator or such that rotation of the wheel may drive the electric motor/generator, wherein the electric motor/generator is mounted on the suspension arm, wherein the trailer or/the semi-trailer is connected to the tractor so that the tractor or the semi-trailer can be towed by the tractor, and the tractor is provided with a drive apparatus which is operable to drive the tractor, the or each electric motor/generator of the trailer or the semi-trailer being operable to either assist the drive apparatus of the tractor in driving the vehicle or to be operated instead of the drive apparatus to drive the vehicle without use of the drive apparatus of the tractor.

15. A vehicle suspension arm assembly comprising a suspension arm with a first portion wherein the suspension arm can be pivotally connected to a vehicle body, a second portion on which is mounted a spring, the vehicle suspension arm assembly further comprising an electric motor/generator, a wheel hub assembly having a wheel mount on which a wheel may be mounted, and a driveline which connects the electric motor/generator to the wheel hub assembly such that rotation of the wheel mount about a wheel axis may be driven by the electric motor/generator or such that rotation of the wheel mount may drive the electric motor/generator, wherein the electric motor/generator, the wheel hub assembly and the driveline are mounted on the suspension arm, and the electric motor/generator and the wheel hub assembly are on a same side of the suspension arm, the wheel hub assembly being mounted on an intermediate portion of the suspension arm which is between the first portion and the second portion of the suspension arm, the electric motor/generator being mounted on a third portion of the suspension arm which is offset relative to a line extending between the first portion and the second portion, and the third portion is connected to the intermediate portion by a driveline support portion of the suspension arm, the driveline being mounted on the driveline support portion.

16. The suspension arm assembly according to claim 15, wherein the intermediate portion is offset between the first portion and the second portion.

17. The suspension arm assembly according to claim 15, wherein the wheel hub assembly comprises at least one epicyclic gear train which is connected between the wheel mount and the driveline to transmit a drive torque between the driveline and the wheel mount, the epicyclic gear train comprises a sun gear which is connected to the driveline so that the driveline drives or is driven by rotation of the sun gear, and a planet gear which meshes with the sun gear and which is supported by a carrier, the carrier being connected to the wheel mount such that rotation of the wheel mount is driven by or drives rotation of the carrier.

18. The suspension arm assembly according to claim 15 wherein the spring is mounted on the second portion via a spring support shaft, the electric motor/generator is configured to rotate about a motor axis, wherein the suspension arm includes a support strut which extends from the second portion to the third portion, and the driveline support portion, the support strut and the second portion of the suspension arm form a triangle with the motor axis, the wheel axis and the spring support shaft each being at one of three corners of the triangle.

* * * * *